(12) United States Patent
Nagao et al.

(10) Patent No.: US 6,590,567 B1
(45) Date of Patent: Jul. 8, 2003

(54) COORDINATE INPUT DEVICE

(75) Inventors: Naoyuki Nagao, Tokyo (JP); Norio Endo, Tokyo (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 286 days.

(21) Appl. No.: 09/584,686

(22) Filed: Jun. 1, 2000

(30) Foreign Application Priority Data

Jun. 30, 1999 (JP) .......................................... 11-186599

(51) Int. Cl.$^7$ ................................................ G06K 11/06
(52) U.S. Cl. ...................................... 345/173; 178/18.1
(58) Field of Search ............................... 345/173, 174, 345/177, 156, 157, 159, 160, 179; 178/18.1–18.7

(56) References Cited

U.S. PATENT DOCUMENTS

| | | | | |
|---|---|---|---|---|
| 5,818,430 A | * | 10/1998 | Heiser | 345/174 |
| 5,898,426 A | * | 4/1999 | Kim | 345/173 |
| 5,943,043 A | * | 8/1999 | Furuhata et al. | 345/173 |
| 6,057,830 A | * | 5/2000 | Chan et al. | 345/157 |
| 6,208,329 B1 | * | 3/2001 | Ballare | 345/173 |
| 6,246,394 B1 | * | 6/2001 | Kalthoff et al. | 345/173 |
| 6,278,444 B1 | * | 8/2001 | Wilson et al. | 345/173 |

FOREIGN PATENT DOCUMENTS

| | | |
|---|---|---|
| JP | 6-149462 | 5/1994 |
| JP | 7-78050 | 3/1995 |
| JP | 9-97133 | 4/1997 |
| JP | 9-114592 | 5/1997 |
| JP | 10-149254 | 6/1998 |
| JP | 10-333820 | 12/1998 |
| JP | 11-31037 | 2/1999 |

* cited by examiner

Primary Examiner—Vijay Shankar
Assistant Examiner—Nitin Patel
(74) Attorney, Agent, or Firm—Staas & Halsey LLP

(57) ABSTRACT

A touch screen unit including a touch-sensitive panel outputting voltage signals concerning a position of a contact made thereon and a control unit generating coordinate information and operation information of the contact based on said voltage signals is provided. The operation information corresponds to operations of two or more switches.

40 Claims, 36 Drawing Sheets

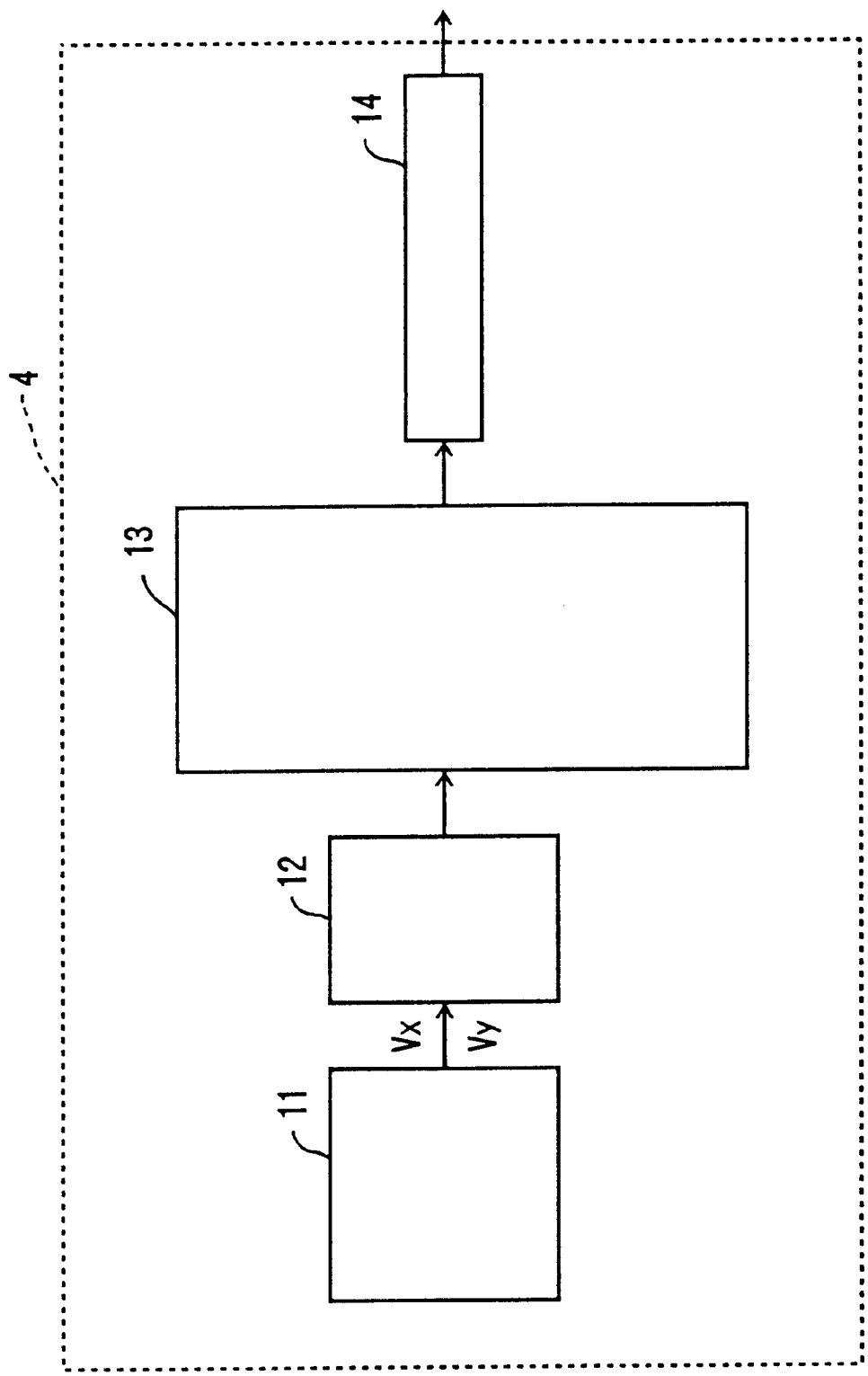

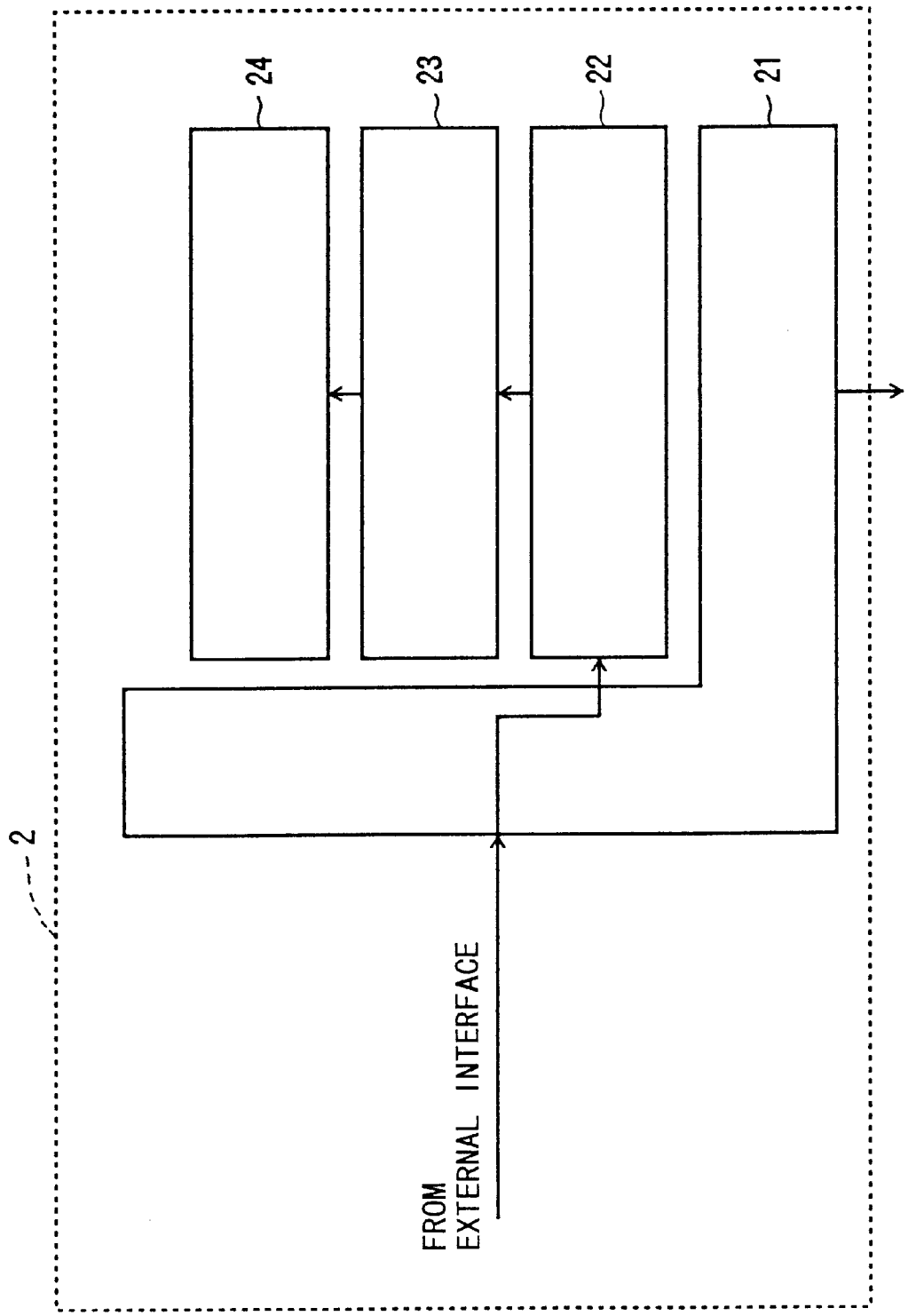

F I G. 7
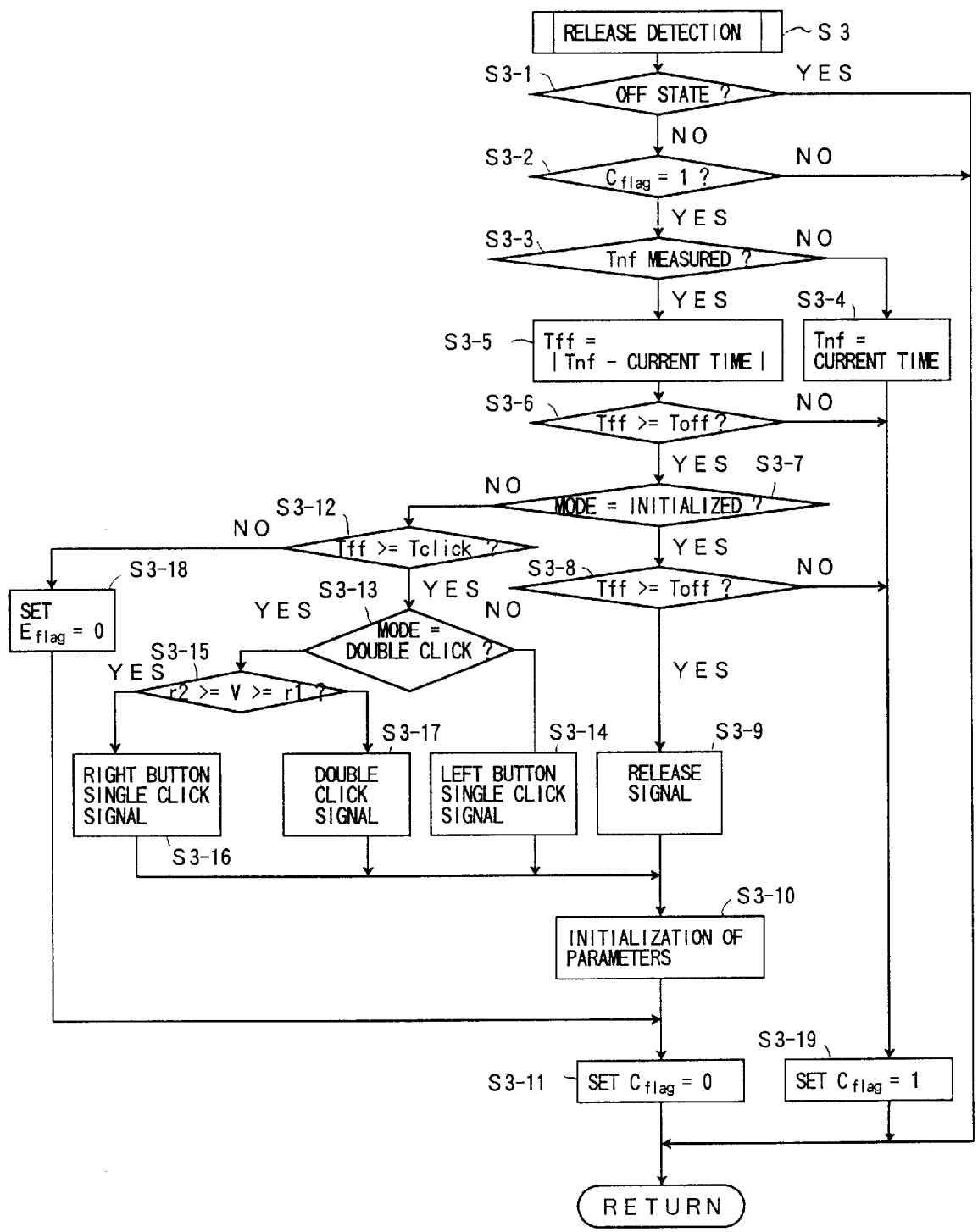

F I G. 1 9
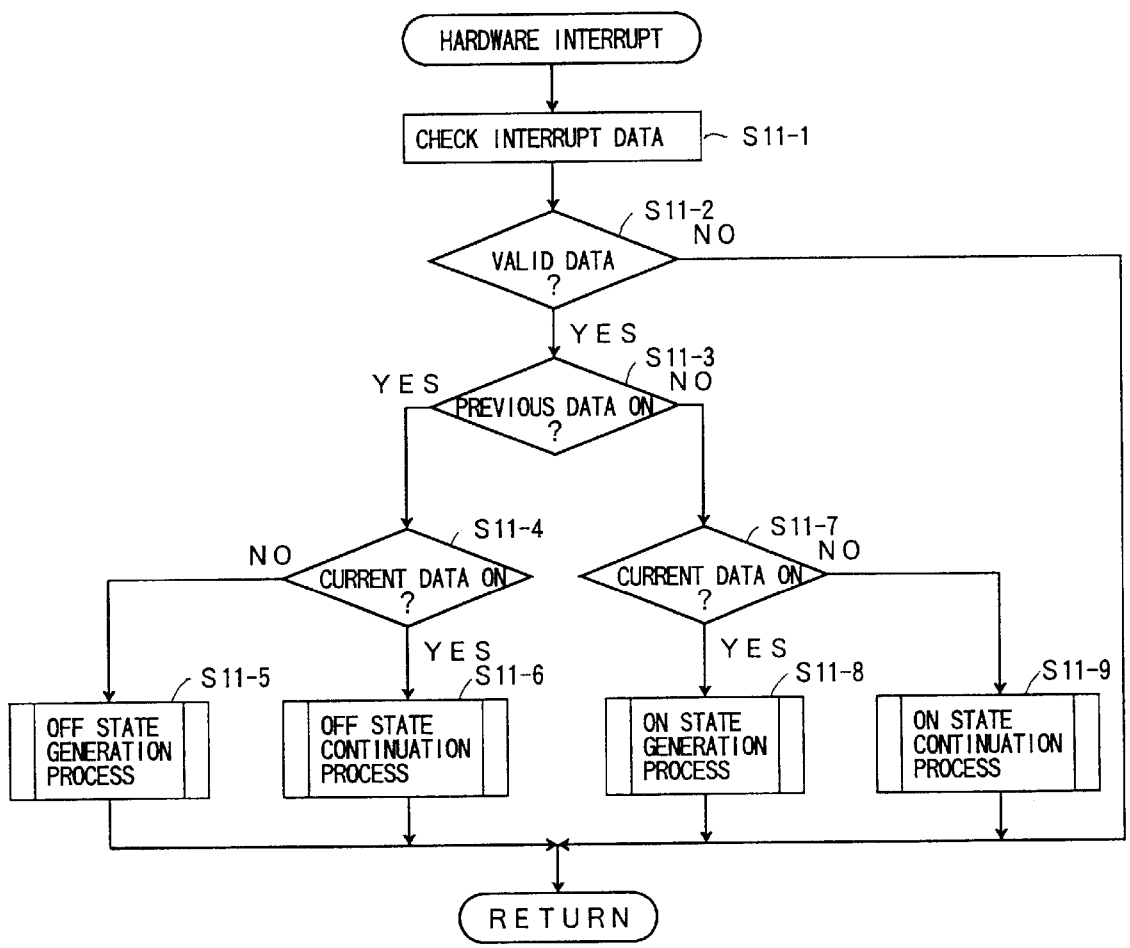

F I G. 2 2
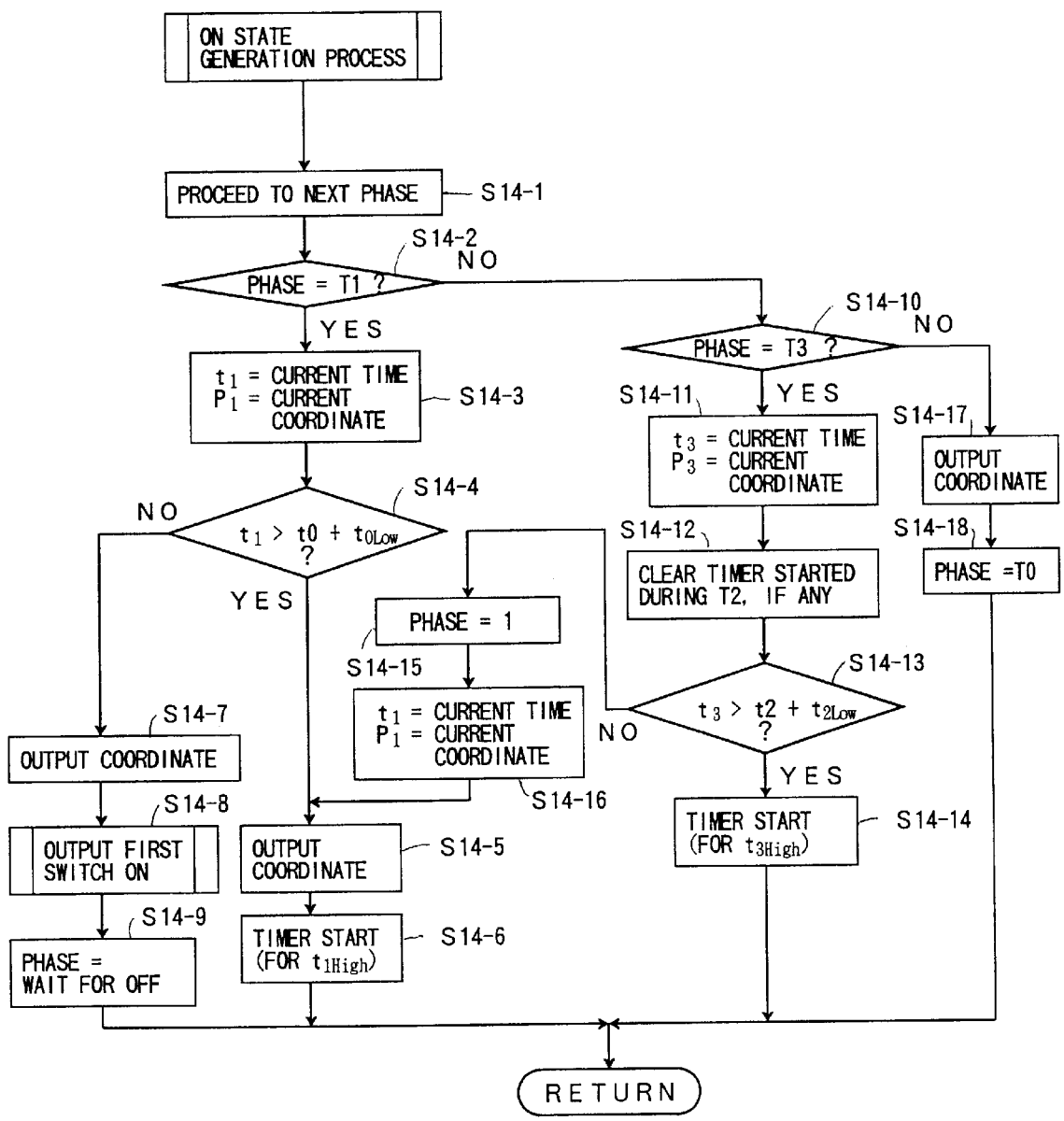

COORDINATE INPUT DEVICE

BACKGROUND OF THE INVENTION

1. Field of the Invention

The present invention generally relates to a coordinate input device for detecting a set of coordinates of a position of a contact on a position-sensitive surface. The present invention particularly relates to a coordinate input device which can simulate various mouse button operations.

A touch screen or a touch panel is a type of coordinate input devices that can be used as a position detecting device of a personal computer. In operating the personal computer, the user may simply touch objects, such as icons, displayed on a display. The touch screen may be of any type described below. One type of touch screen may include an upper conductive layer and a lower resistive layer overlaid on the upper conductive layer with a gap between the layers. Other types of the touch screen may include an upper resistive layer provided with a pair of parallel electrodes and a lower resistive layer provided with a pair of parallel electrodes arranged perpendicular to the pair of electrodes on the upper resistive layer. The upper and lower layers come into contact when there is a touch on the touch screen. The touch screen outputs coordinate information of the position of a touch, and basically operates as a single switch.

2. Description of the Related Art

It is known to place a coordinate input device such as a touch screen over a display face in order to specify a position on the display face.

The touch screen determines whether the upper and lower layers are in contact and then obtains the coordinate of the position of contact based on an electric potential distribution. Thus, the touch screen realizes operations such as positioning a cursor to a specified position displayed on the display. The touch screen of the related art can only determine whether or not the upper and lower layers are in contact. That is to say, only an ON/OFF representation is possible with the touch screen of the related art. Thus, the touch screen of the related art only serves as one switch.

When the touch screen is used with an OS (Operating System), such as Windows, based on a GUI (Graphical User Interface), a touch can only represent either a right button or a left button of a mouse.

Various techniques have been developed in order achieve a plurality of functions with the touch screen. For instance, with Windows CE, a touch on the touch screen panel corresponds to a left button operation of the mouse, and a touch on the touch screen simultaneous with an operation of a predetermined key of the keyboard corresponds to a right button operation of the mouse.

With a Windows system, when an icon displayed in a task tray is touched and the same icon is touched again directly after the first touch, it is identified as an operation of the right button. Thus, a plurality of functions can be represented.

Also, for a touch screen used with a dedicated retractable pen, retracting the tip of the pen represents the left button operation and pressing a button provided on the pen represents the right button operation.

However, with the coordinate input device of the related art, a touch on the touch screen is not sufficient for achieving the coordinate input operation and two button operations. Therefore, with the coordinate input device of the related art, it is necessary to use a further input device having two buttons to achieve two button operations.

Thus, in order to achieve the two button operation by the touch screen, it is necessary to use further input devices such as a dedicated pen or a keyboard. This results in an increased cost of a computer, when mounted on the computer such the notebook-type personal computer.

Further, it is known to configure a touch screen such that a touch on the touch screen corresponds to the left button operation. Then, such left button operation will be executed even in cases where it is simply required to designate a coordinate of a certain position. This then becomes an awkward function.

It is also possible to provide a predetermined region on the touch screen such that this region corresponds to the right button. With this structure, the right button operation is realized by touching the predetermined region on the touch screen. However, this results in complicated operations.

SUMMARY OF THE INVENTION

Accordingly, it is a general object of the present invention to provide a coordinate input device which can avoid complicated operations.

It is another and more specific object of the present invention to provide a system which can generate information corresponding to operations of various switches of a mouse.

In order to achieve the above objects according to the present invention, there is provided a touch screen unit comprising:

a touch-sensitive panel outputting voltage signals concerning a position of a contact made thereon; and a control unit generating coordinate information and operation information of the contact based on said voltage signals, wherein said operation information corresponds to operations of two or more switches.

With the system described above, a coordinate input device such as a touch screen can implement various operations which may correspond to right and left button operations of a mouse.

The present invention also provides a method of generating information corresponding to operations of two or more switches based on a state of contact on the position-sensitive surface. Further, the present invention provides a machine readable medium storing program code means for implementing such a method.

Other objects and further features of the present invention will be apparent from the following detailed description when read in conjunction with the accompanying drawings.

BRIEF DESCRIPTION OF THE DRAWINGS

FIG. 2 is a block diagram showing a touch screen unit of the coordinate input device of the first embodiment of the present invention.

FIG. 3 is a block diagram showing a computer main body used with a coordinate input device of the first embodiment of the present invention.

FIG. 7 is a detailed flowchart of a release detection step shown in FIG. 5.

FIG. 19 is a flowchart showing an operation of the device driver of the second embodiment of the present invention upon occurrence of a hardware interrupt.

FIG. 22 is a flowchart showing an ON generation process of FIG. 19.

DETAILED DESCRIPTION OF THE PREFERRED EMBODIMENTS

In the following, principles and embodiments of the present invention will be described with reference to the accompanying drawings.

Figure 1:
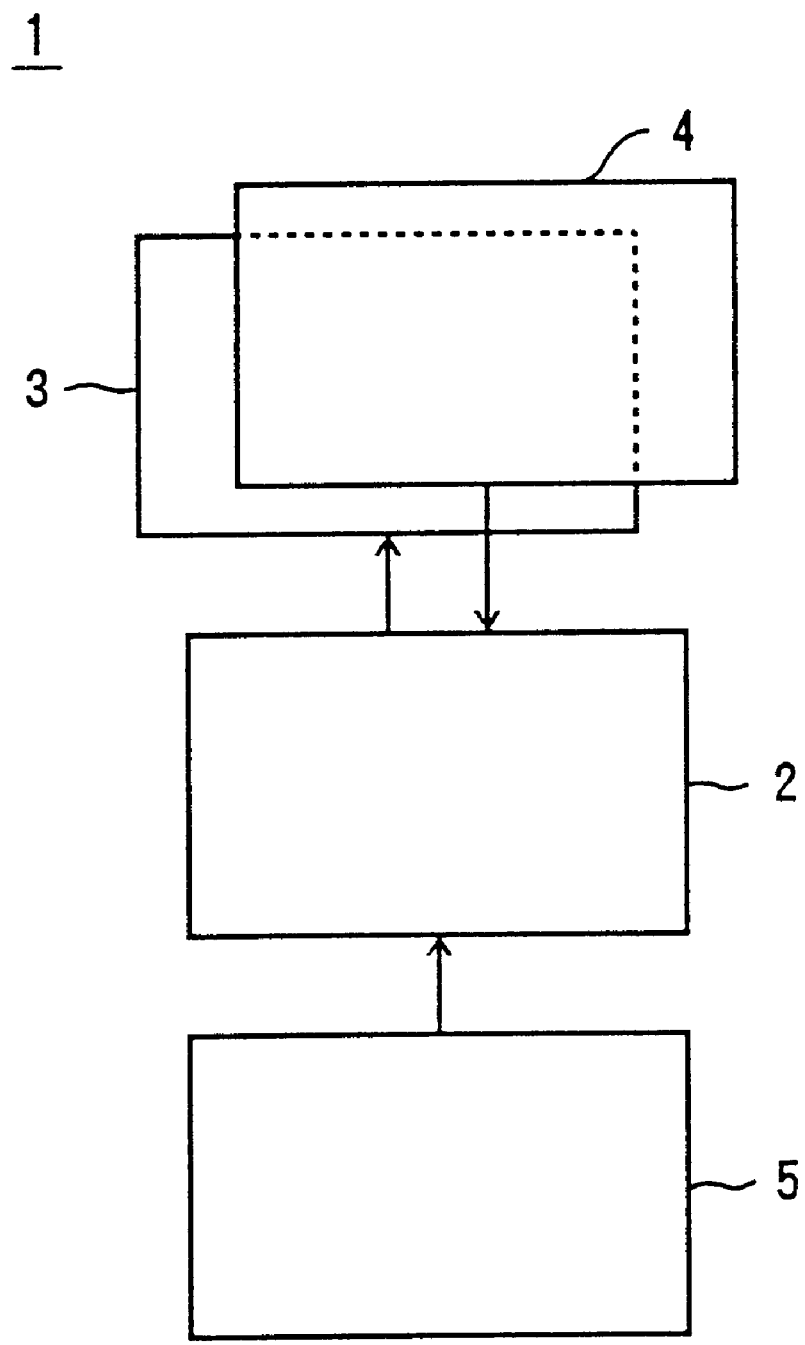
FIG. 1 is a schematic diagram showing system configuration incorporating a coordinate input device of a first embodiment of the present invention.

FIG. 1 is a schematic diagram showing a system configuration including a coordinate input device of a first embodiment of the present invention. A computer system 1 of the present invention includes a computer main body 2, a display unit 3, a coordinate input device or a touch screen unit 4 of the present invention and a keyboard 5.

The display unit 3 and the touch screen unit 4 are connected to the computer main body 2. The display unit 3 may be an LCD (Liquid Crystal Display) which outputs or displays data supplied from the computer main body 2.

It is to be noted that any type of touch screen unit 4 may be used in the present invention. One type of the touch screen may include an upper conductive layer and a lower resistive layer of a film overlaid on the upper conductive layer with a gap between the layers. Other types of the touch screen may include an upper resistive layer provided with a pair of parallel electrodes and a lower resistive layer provided with a pair of parallel electrode arranged perpendicular to the pair of electrodes of the upper resistive layer.

The touch screen unit 4 outputs coordinate information when the upper and lower layers are brought into contact. The touch screen unit 4 is placed over a display face of the display unit 3 and is connected to the computer main body 2 so as to output coordinate information corresponding to a position on the display face of the display unit 3.

The computer main body 2 moves a cursor displayed on the display 3 to a position corresponding to the coordinate information supplied from the touch screen unit 4. In the present invention, the touch screen unit 4 also outputs information equivalent to a right button and a left button of a mouse. As will be described later, the button information is obtained based on a temporal characteristic (timing) and a positional characteristic (vector) of a contact on the touch screen unit 4.

FIG. 2 shows a block diagram of the touch screen 4 of the first embodiment of the present invention. The touch screen unit 4 includes a touch screen 11, a driving circuit 12, an MCU (Microprogram Control Unit) 13 and an external interface 14.

The touch screen 11 is connected to the driving circuit 12 and is driven by voltages (not shown) supplied from the driving circuit 12. The touch screen 11 detects an X-coordinate detection voltage Vx and a Y-coordinate detection voltage Vy based on the position of contact. Then, the X-coordinate detection voltage Vx and the Y-coordinate detection voltage Vy are supplied to the driving circuit 12. The driving circuit 12 passes the X-coordinate detection voltage Vx and a Y-coordinate detection voltage Vy to the MCU 13.

The MCU 13 derives the coordinate information of the position of contact based on the X-coordinate detection voltage Vx and a Y-coordinate detection voltage Vy. Also, the MCU 13 outputs right button manipulation information and left button manipulation information according to temporal and positional characteristics of an occurrence of the coordinate information. The MCU 13 is connected to the external interface 14. The external interface 14 supplies the coordinate information and the right and left button manipulation information, all of which being generated at the MCU 13, to the computer main body 2.

FIG. 3 is a block diagram showing the computer main body 2 used in combination with a coordinate input device or the touch screen unit 4 of a first embodiment of the present invention. The computer main body 2 includes a personal computer (PC) hardware part 21, an operating system (OS) 22, a device driver 23 and an application software 24.

The PC hardware part 21 receives the coordinate information and the right and left button manipulation information supplied from the external interface 14 of the touch screen unit 4. Then, the coordinate information and the right and left button manipulation information are transferred to the OS 22, to the device driver 23 and finally to the application software 24.

The application software 24 executes various processes according to the coordinate information and the right and left button manipulation information received from the device driver 23.

Figure 4:
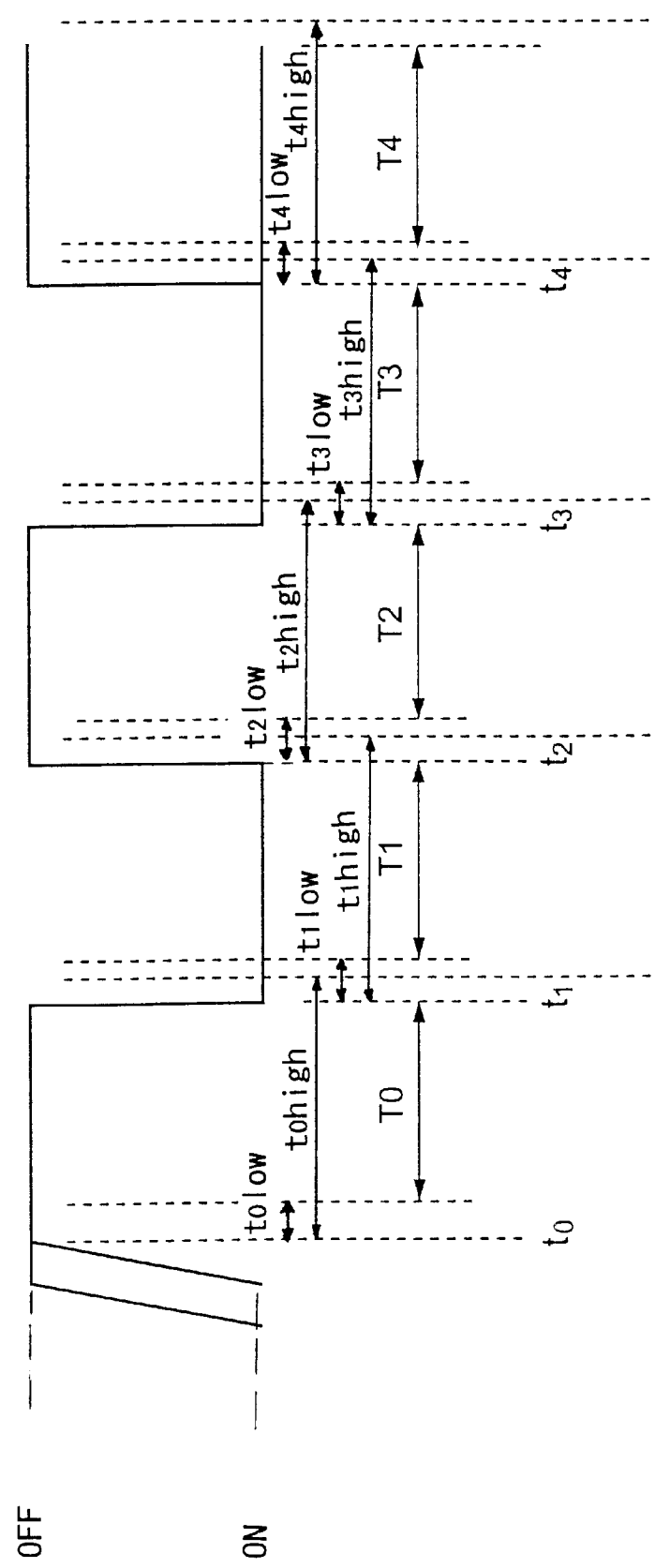
FIG. 4 is a timing chart showing an operation of the touch screen unit of the present invention.

Referring now to FIG. 4, an example of settings of a timing of the coordinate input device of the present invention will be described. FIG. 4 illustrates phases T0 through T4. The touch screen unit 4 may have an ON state and an OFF state. Time variables $t_0$ to $t_4$ represents various timings when there is a change of voltage at the touch screen unit 4.

Phase T0 is determined as follows. Time $t_0$ is defined as an initial time required for determination of phase T0. When the voltage of the touch screen unit 4 is changed from ON state to OFF state, current time is stored in time $t_0$. When a predetermined time period $t_{0low}$ has elapsed from time $t_0$, the process enters phase T0. When a predetermined time period $t_{0high}$ has elapsed from time $t_0$, the process leaves phase T0. In other words, maximum range of phase T0 may be expressed as $t_{0high}-t_{0low}$. Then, when the voltage level at the touch screen unit 4 changes from OFF state to ON state, current time is stored in time $t_1$, and the process leaves phase T0. Time $t_1$ is defined as an initial time required for determination of phase T1. If there is no change of voltage during maximum range $t_{0high}-t_{0low}$, current time is again stored in time $t_0$.

Phase T1 is determined as follows. When a predetermined time period $t_{1low}$ has elapsed from time $t_1$, the process enters phase T1. When a predetermined time period $t_{1high}$ has elapsed from time $t_1$, the process leaves phase T1. In other words, maximum range of phase T1 may be expressed as $t_{1high}-t_{1low}$. Then, when the voltage level at the touch screen unit 4 changes from ON state to OFF state, current time is stored in time $t_2$, and the process leaves phase T1. Time $t_2$ is defined as an initial time required for determination of phase T2. If there is no change of voltage during maximum range $t_{1high}-t_{1low}$, current time is again stored in time $t_0$.

Phase T2 is determined as follows. When a predetermined time period $t_{2low}$ has elapsed from time $t_2$, the process enters phase T2. When a predetermined time period $t_{2high}$ has elapsed from time $t_2$, the process leaves phase T2. In other words, maximum range of phase T2 may be expressed as $t_{2high}-t_{2low}$. Then, when the voltage level at the touch screen unit 4 changes from OFF state to ON state, current time is stored in time $t_3$, and the process leaves phase T2. Time $t_3$ is defined as an initial time required for determination of phase T3. If there is no change of voltage during maximum range $t_{2high}-t_{2low}$, current time is again stored in time $t_0$.

Phase T3 is determined as follows. When a predetermined time period $t_{3low}$ has elapsed from time $t_3$, the process enters phase T3. When a predetermined time period $t_{3high}$ has elapsed from time $t_3$, the process leaves phase T3. In other words, maximum range of phase T3 may be expressed as $t_{3high}-t_{3low}$. Then, when the voltage level at the touch screen unit 4 changes from ON state to OFF state, current time is stored in time $t_4$, and the process leaves phase T3. Time $t_4$ is defined as an initial time required for determination of phase T4. If there is no change of voltage during maximum range $t_{3high}-t_{3low}$, current time is again stored in time $t_0$.

Phase T4 is determined as follows. When a predetermined time period $t_{4low}$ has elapsed from time $t_4$, the process enters phase T4. When a predetermined time period $t_{4high}$ has elapsed from time $t_4$, the process leaves phase T4. In other words, maximum range of phase T4 may be expressed as $t_{4high}-t_{4low}$. Then, the operation at the touch screen unit 4 is determined as a double-click. If the voltage level at the touch screen unit 4 does not change during phase T3, the operation is regarded as another operation such as a drag.

Operations such as click, double-click and button swap may be determined by means of the timing chart as described above. Operations corresponding to different switches may be determined by positional characteristics.

In the following, an operation of the MCU 13 of the touch screen unit 4 will be described with reference to FIG. 5, which is a flowchart showing an operation of the MCU 13 of the touch screen unit 4 shown in FIG. 2.

The MCU 13 monitors a touch on the touch screen 11. Here, the term "touch" is to be understood as a state where the upper and lower layers of the touch screen come into contact and are kept in contact for over a predetermined period of time (e.g. T1 or T3 in FIG. 4). If a touch is detected at the touch screen 11 (step S1), then the coordinate of the position of the touch is checked (step S2).

After steps S1 and S2, a release on the touch screen 11 is monitored (step S3). Here, the term "release" is understood to mean a state in which the upper and lower layers of the touch screen come to a non-contact state after an occurrence of the touch and are kept in a non-contact state for a predetermined period of time (e.g. T0, T2 or T4 in FIG. 4). If the release is detected at step S3, the output data is verified (step 4). Then, based on a result of the verification at step S4, it is determined whether or not there is an output data (step S5).

If it is determined, at step S5, that there is an output data, the output data is output to the computer main body 2 (step S6). The process returns to step S1. If it is determined, at step S5, that there is no output data, the process directly returns to step S1.

The coordinate information and the right and left button manipulation information are supplied to the computer main body 2 by repeating the above-described steps S1 through S6.

In the following, the touch detection step of step S1 will be described in detail.

Figure 5:
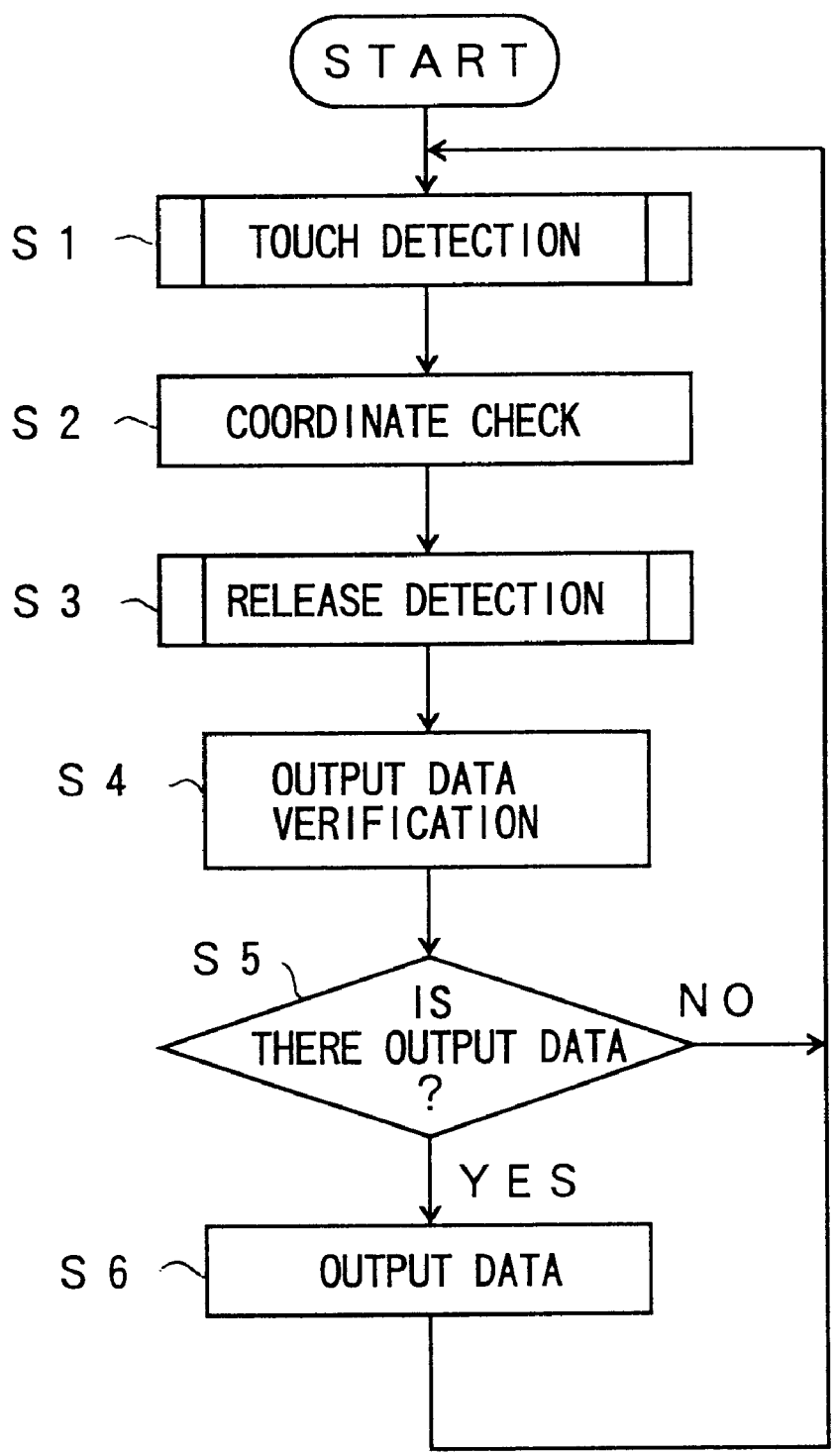
FIG. 5 is a flowchart showing an operation of the MCU of the touch screen unit shown in FIG. 2.
Figure 6:
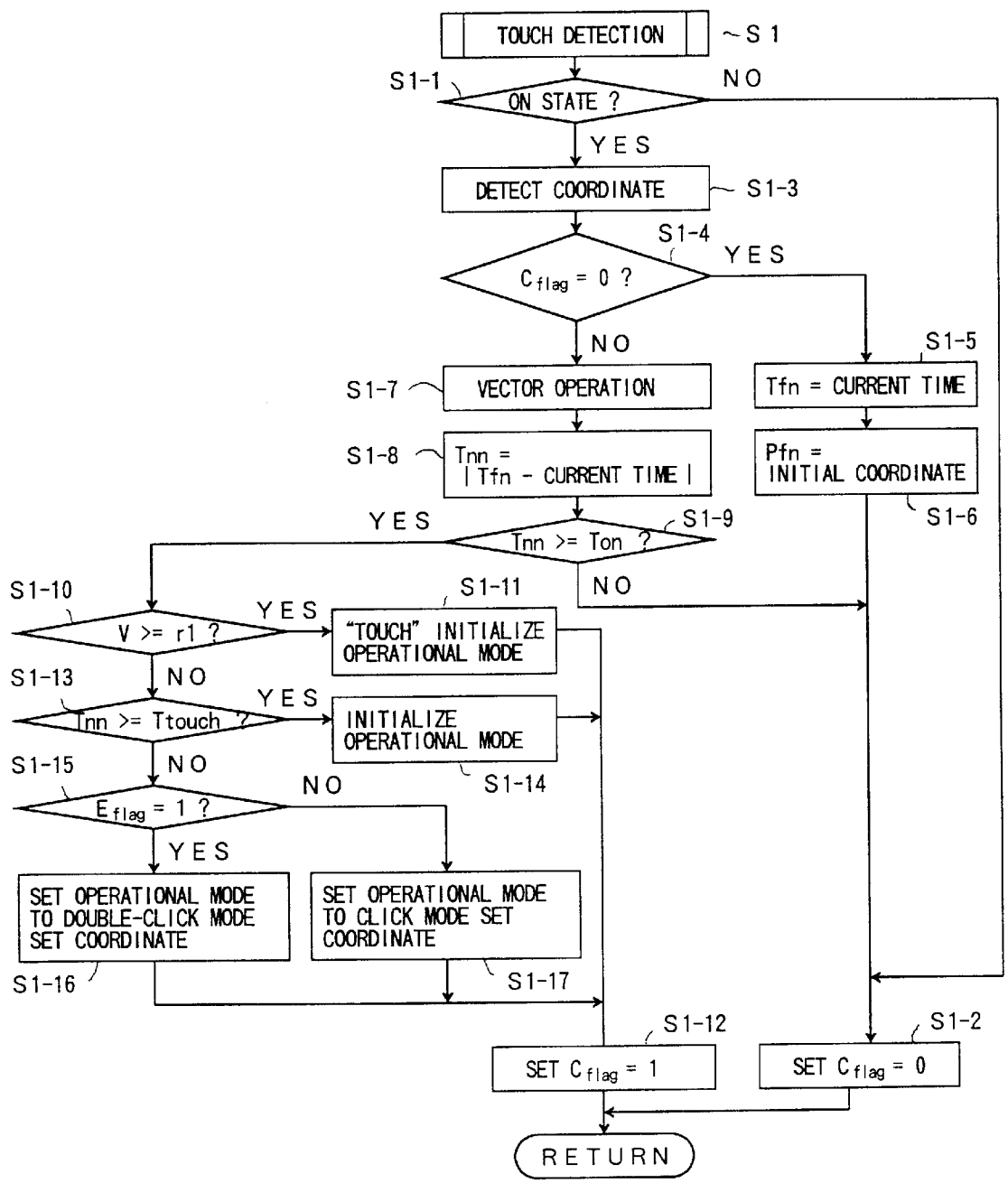
FIG. 6 is a detailed flowchart of a touch detection step shown in FIG. 5.

FIG. 6 is a detailed flowchart of a touch detection step shown in FIG. 5. Variables used in FIG. 6 are listed below.

$T_{fn}$ represents time of transition from an OFF state to an ON state. This corresponds to $t_1$ or $t_3$ in FIG. 4.

$P_{fn}$ represents an initial coordinate of a contact point at time $T_{fn}$.

V represents the size of a vector having the point $P_{fn}$ as a starting point and the currently detected point as an end point.

$T_{nn}$ represents duration of the ON state. This corresponds to T1 or T3 in FIG. 4.

$T_{on}$ represents a minimum time period from time $T_{fn}$ that is required for the ON state to be regarded as a contact state. When time period $T_{nn}$ is smaller than time period $T_{on}$, the operation is not regarded as in a contact state. $T_{on}$ corresponds to $t_{1low}$ or $t_{3low}$ in FIG. 4.

r1 represents a predetermined boundary value of V. When V is greater than or equal to r1, the contact state is regarded as a "touch". In the following figures, a reference symbol A represents an area having r1 as a radius.

$T_{touch}$ is a predetermined boundary value of the time period $T_{nn}$. $T_{touch}$ is chosen to be greater than $T_{on}$. When $T_{nn}$ is greater than or equal to $T_{touch}$, the contact is regarded as a "touch". This corresponds to $t_{1high}$ or $t_{3high}$ in FIG. 4.

$C_{flag}$ represents a contact status information stored in the MCU 13. When $C_{flag}=1$, there has been a "touch" on the touch screen 11. When $C_{flag}=0$, there has been a "release" on the touch screen 11, or the detected contact is a new contact.

$E_{flag}$ represents an extended stage status information stored in the MCU 13. When $E_{flag}=1$, the process is in an extended stage. When $E_{flag}=0$, the process is not in the extended stage.

In the touch detection step of step S1, first, it is determined whether or not the touch screen 11 is in an ON state (step S1-1). If the touch screen is in an OFF state, the contact status information $C_{flag}$ is set to a value "0" (step S1-2). If the touch screen 11 is in an ON state, the coordinate of the position where the upper and lower layer of the touch screen are in contact is detected from the X-coordinate detection voltage Vx and the Y-coordinate detection voltage Vy (step S1-3).

Then, the contact status information is checked to see whether a release data has been outputted or it is a new contact (step S1-4). If the result of step S1-4 is positive, current time is stored in $T_{fn}$ (step S1-5). After setting the detected coordinate as an initial coordinate $P_{fn}$ (step S1-6), the contact status information $C_{flag}$ is set to a value "0" (step S1-2).

If the result of step S1-4 is negative, a vector operation is carried out so as to obtain the size of a vector from the initial coordinate $P_{fn}$ to the detected coordinate (step S1-7).

Further, a time difference between the current time $T_{fn}$ previously stored in the MCU 13 at step S1-5 and the current time obtained from the present detection is obtained (step S1-8). Thus, the time period $T_{nn}$ (=$|T_{fn}-$(current time)$|$) between the previous contact and the currently detected contact is obtained.

Then, it is determined whether or not the time period $T_{nn}$ between the previous contact and the currently detected contact is greater than or equal to a predetermined time period $T_{on}$ (step S1-9). If the result of step S1-9 is negative, it is determined as a false operation and the contact status information $C_{flag}$ is set to a value "0" (step S1-2).

If the result of step S1-9 is positive, the process proceeds to step S1-10. At step S1-10, it is determined whether the size V of the vector between the previous contact and the currently detected contact is greater than or equal to the predetermined value r1.

If the size V of the vector is greater than or equal to the predetermined value r1, it is determined that the process is not in the extended stage. At step S1-11, an operational mode is initialized and a touch signal is produced. Then at step S1-12, the contact status information $C_{flag}$ is set to a value "1".

Also, if the size V of the vector is less than the predetermined value r1, the process proceeds to step S1-13. Then, it is determined whether or not the time period $T_{nn}$ between the previous touch and the currently detected touch is smaller than a predetermined time period $T_{touch}$ (step S1-13).

If the time period $T_{nn}$ between the previous touch and the currently detected touch is greater than the time period $T_{touch}$, it is determined that the currently detected contact does not fall into an extended operation. At step S1-14, an operational mode is initialized. After initialization of the operational mode at step S1-14, the contact status information $C_{flag}$ is set to a value "1" at step S1-12.

If, at step S1-13, it is determined that the time period $T_{nn}$ between the previous touch and the currently detected touch is less than the time period $T_{touch}$, the process proceeds to step S1-15. Then, it is determined whether or not the process is in an extended stage (step S1-15). The extended stage is set in the release detection process described later with reference to FIG. 7.

If, at step S1-15, it is determined that the operation is in the extended stage, the operational mode is set to a double-click mode and the initial coordinate is stored in the MCU 13 (step S1-16). If, at step S1-15, it is determined that the operation is not in the extended stage, the operational mode is set to a click mode and the initial coordinate is stored in the MCU 13 (step S1-17). After the operational mode and the coordinate have been stored in the MCU 13 at steps S1-16 and S1-17, the contact status information $C_{flag}$ is set to a value "1" at step S1-12. Then, the process returns to the main process.

Referring again to FIG. 5, the coordinate stored in the MCU 13 in the touch detection process of step S1 is checked at step S2. Then, the release detection process of step S3 is carried out.

In the following, the release detection process of step S3 will be described.

FIG. 7 is a detailed flowchart of a release detection step shown in FIG. 5. Variables used in FIG. 7 are listed below.

$T_{nf}$ represents time of transition from an ON state to an OFF state. This corresponds to $t_0$, $t_2$ or $t_4$ in FIG. 4.

$T_{ff}$ represents duration of the OFF state. This corresponds to T0, T2 or T4 in FIG. 4.

$T_{off}$ represents a minimum time period from time $T_{nf}$ that is required for the OFF state to be regarded as a non contact state. When time period $T_{ff}$ is smaller than time period $T_{off}$, the OFF state is not regarded as a non-contact state and remains in a contact state. This corresponds to $t_{0low}$, $t_{2low}$ or $t_{4low}$ in FIG. 4.

$T_{release}$ is a predetermined boundary value of the time period $T_{ff}$. When $T_{ff}$ is greater than or equal to $T_{release}$, the OFF state is regarded as a "release". This corresponds to $t_{0high}$, $t_{2high}$ or $t_{4high}$ in FIG. 4.

In the release detection step of step S3, first, it is determined whether or not the touch screen 11 is in an ON state (step S3-1). The positive result of step S3-1 implies that the upper and lower layers have been brought into contact and have not become an OFF state. Then, the process returns to the main process.

If, at step S3-1, it is determined that the touch screen 11 is in an OFF state, the process proceeds to step S3-2. At step S3-2, it is determined if a "touch" has been previously detected. If the result of step S3-2 is negative, it is determined that there is no "touch" or "release", and the process returns to the main process. If the result of step S3-2 is positive, the process proceeds to step S3-3. At step S3-3, it is determined if $T_{nf}$ has been measured previously.

If, at step S3-3, it is determined that $T_{nf}$ has not been measured previously, current time is set as $T_{nf}$ (step S3-4). Then, an information indicating that there is a "touch" is stored in the MCU 13 at step S3-19. If, at step S3-3, it is determined that $T_{nf}$ has been measured previously, a time period between the previous $T_{nf}$ and current time is measured. In other words, the duration of the OFF state $T_{ff}$ (=|$T_{nf}$-current time) is obtained (step S3-5).

At step S3-6, it is determined whether $T_{ff}$ is greater than or equal to the predetermined time period $T_{off}$. If the result of step S3-6 is negative, the OFF state is regarded as a false operation and the contact status information $C_{flag}$ is set to a value "1" at step S3-19.

If the result of step S3-6 is positive, it is determined that the touch screen 11 is in a non-contact state. Then, at step S3-7, it is determined whether the operational mode stored in the MCU 13 has been initialized.

If the result of step S3-7 is positive, it is determined whether $T_{ff}$ is greater than or equal to $T_{release}$ (step S3-8). If the result of step S3-7 is negative, it is not regarded as a "release" and the contact status information $C_{flag}$ is set to a value "1" at step S3-19.

If the result of step S3-7 is positive, a release signal is produced in step S3-9. Then, parameters such as current time are initialized at step S3-10. Then, the contact status information $C_{flag}$ is set to a value "0" at step S3-11. Then the process returns to the main process.

If the result of step S3-7 is negative, the process proceeds to step S3-12 and determines whether or not $T_{ff}$ is greater than or equal to $T_{click}$. If the result of step S3-12 is positive, the process proceeds to step S3-13 and determines whether the operational mode is set as a double-click mode. If the result of step S3-13 is negative, it is identified as a left button single click operation and a left button single click signal is produced (step S3-14). Then the process proceeds to steps S1-10 and S1-11 described above.

Figure 11:
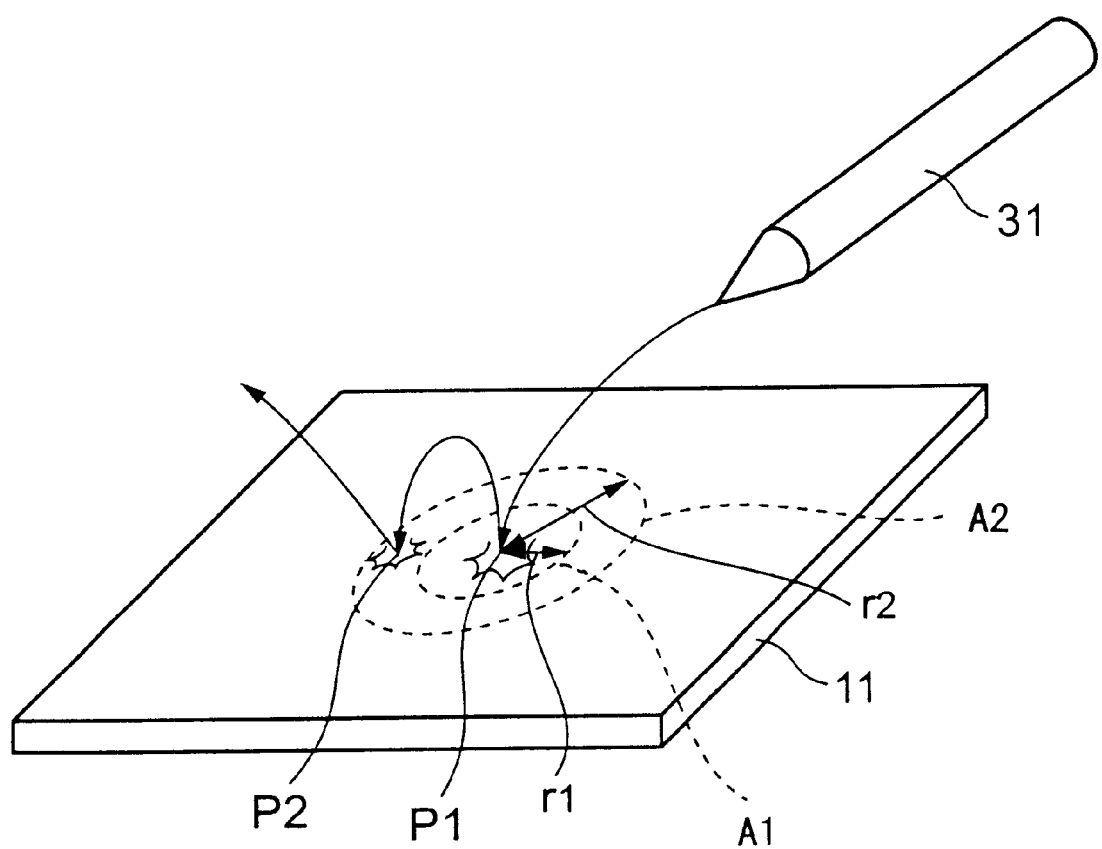
FIG. 11 is a schematic diagram showing a double click operation of the first embodiment of the present invention.

If the result of step S3-13 is positive, the process proceeds to step S3-15 to determine whether or not the size V of the vector is greater than r1 and less than r2 (see FIG. 11). If the result of step S3-13 is positive, it is identified as a right button single click operation and a right button single click signal is produced (step S3-16). Then the process proceeds to steps S1-10 and S1-11 described above.

If the result of step S3-13 is negative (and V is not greater than r2), it is identified as a left button double click operation and a left button double click signal is produced (step S3-17). Then the process proceeds to steps S1-10 and S1-11 described above.

If, at step S3-12, it is determined that $T_{ff}$ is less than $T_{click}$, the extended stage status information $E_{flag}$ is set to a value "1" at step S3-18. Then the process proceeds to steps S1-10 and S1-11 described above.

From the touch detection step S1 and the release detection step S3, a plurality of output operations, such as drag, left button single click, right button single click and double click can be stored in the MCU 13.

Referring now to FIGS. 8 through 11, the plurality of output operations will be described in detail.

Figure 8:
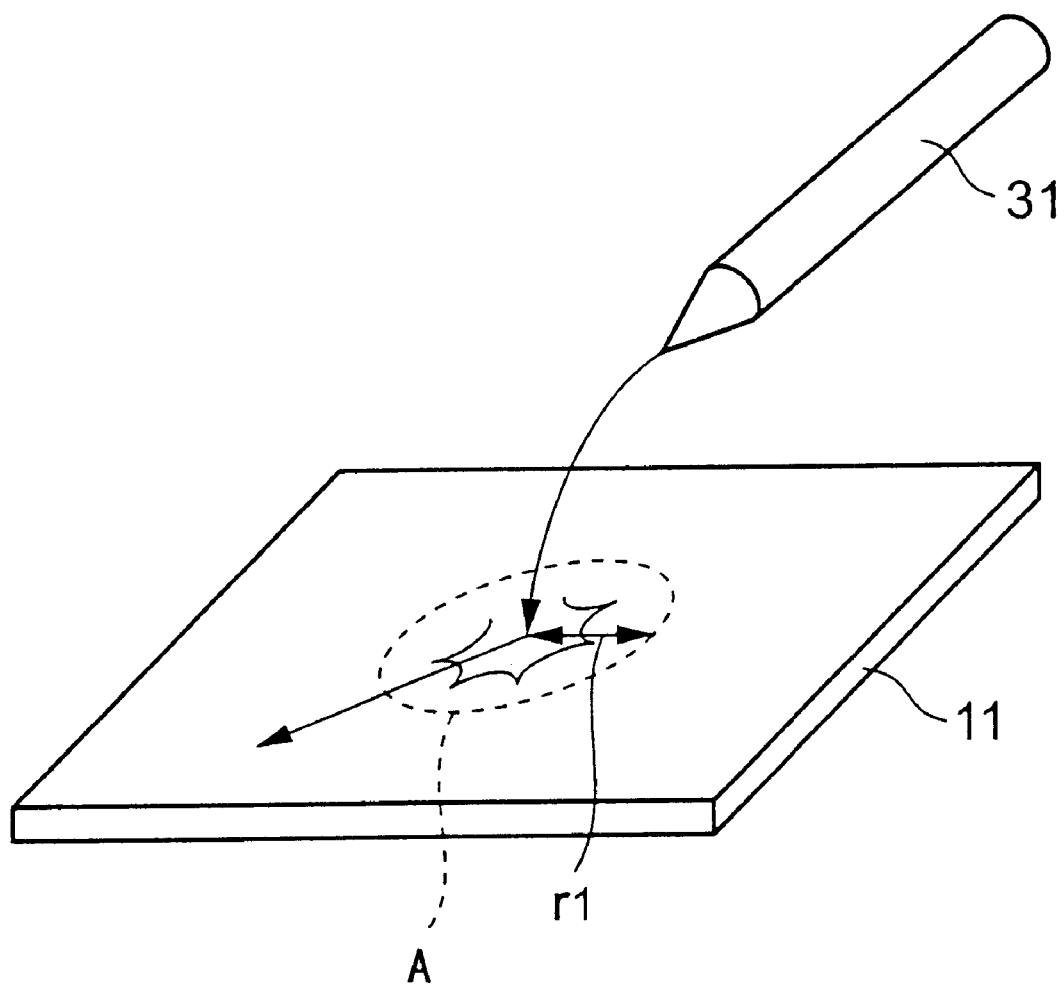
FIG. 8 is a schematic diagram showing a drag operation of the first embodiment of the present invention.

FIG. 8 is a schematic diagram showing a drag operation of the first embodiment of the present invention. A drag signal is produced in the touch detection process of step S1. The drag operation is achieved when a pen 31 contacts the touch panel 11 for a time period greater than $T_{on}$ and moves through a distance greater than r1, and also when the pen 31 contacts for a time period greater than $T_{touch}$.

Figure 9:
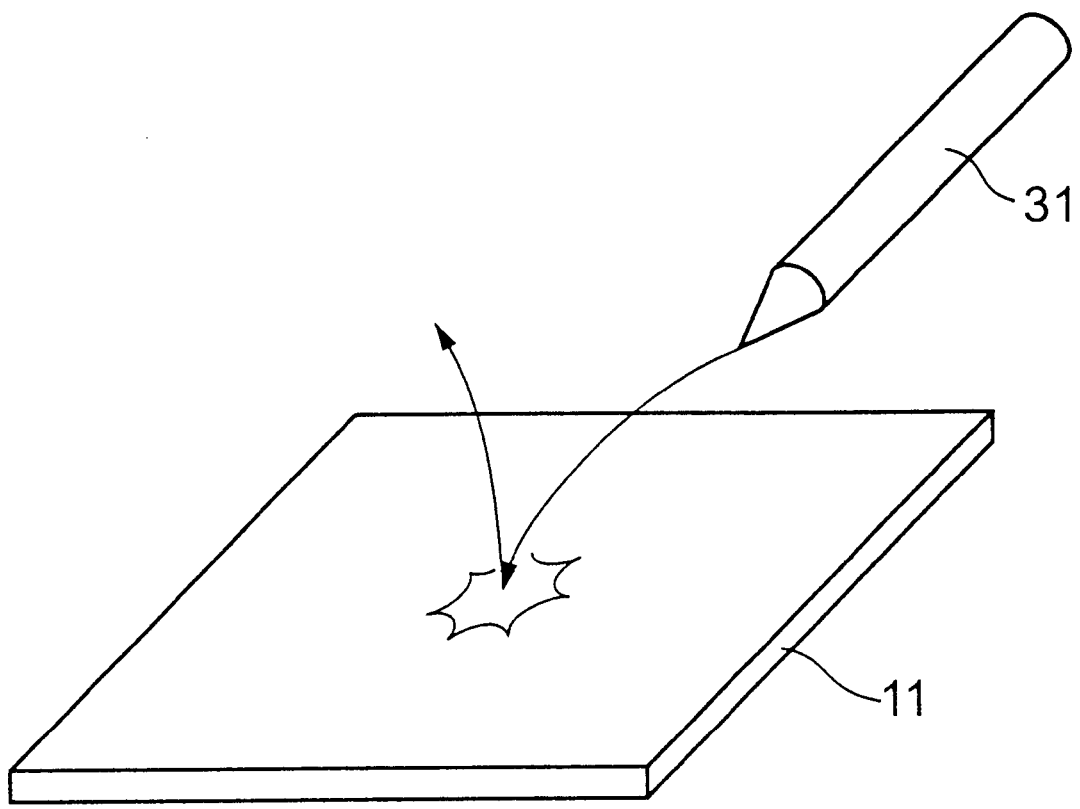
FIG. 9 is a schematic diagram showing a left button single click operation of the first embodiment of the present invention.

FIG. 9 is a schematic diagram showing a left button single click operation of the first embodiment of the present invention. A left button single click operation signal is produced in the release detection process of step S3. The left button single click operation is achieved when a pen 31 contacts the touch panel 11 for a time period greater than $T_{on}$, is lifted from the touch panel 11 within the time period $T_{touch}$ and is kept in a non-contact state for a time period greater than $T_{ff}$.

Figure 10:
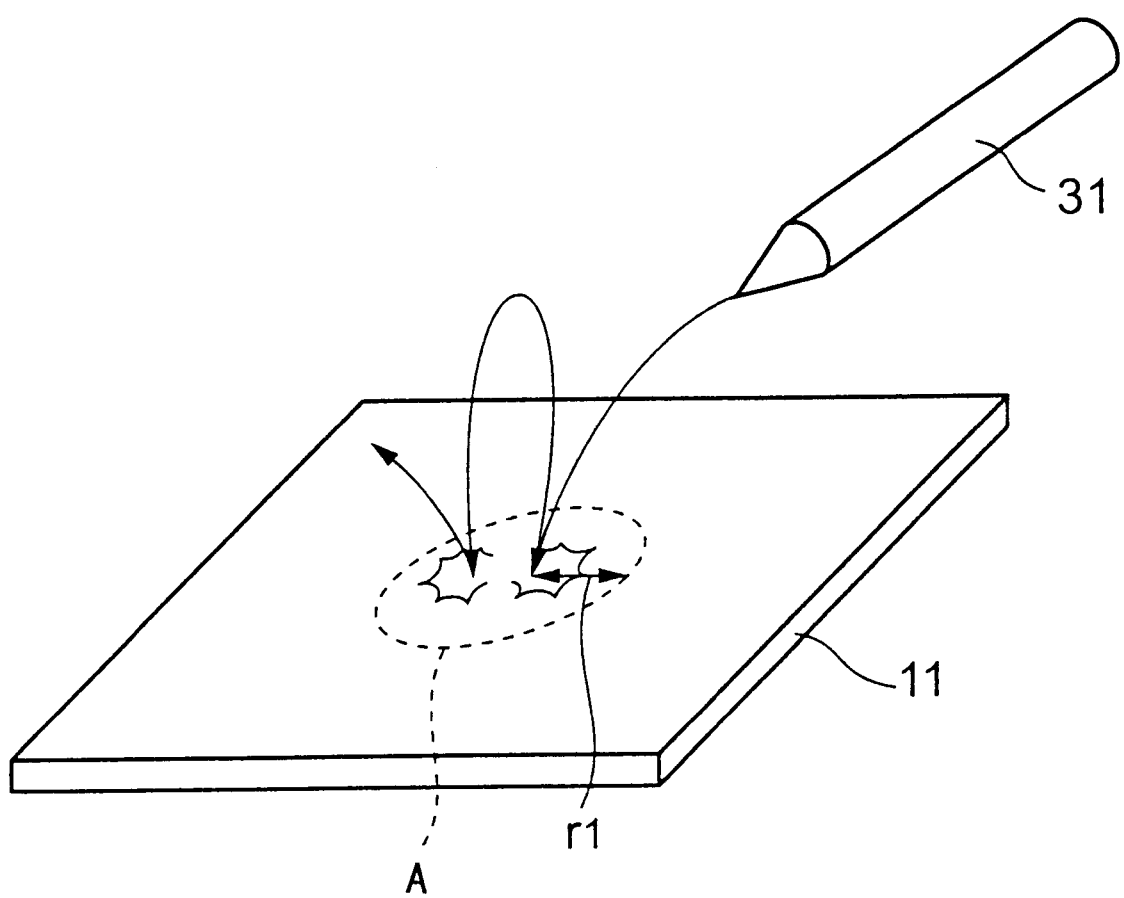
FIG. 10 is a schematic diagram showing a right button single click operation of the first embodiment of the present invention.

FIG. 10 is a schematic diagram showing a double click operation of the first embodiment of the present invention. A double click operation signal is produced in the release detection process of step S3. The double click operation is achieved when a second touch is detected at a position less than r1 from the position of the first touch.

FIG. 11 is a schematic diagram showing a right button single click operation of the first embodiment of the present invention. A right button single click operation signal is produced in the release detection process of step S3. The right button single click operation is achieved when a second touch is detected at a position greater than r1 and less than r2 from the position of the first touch. It is to be noted that the determination of the right button single click operation is not limited to the manner described in the present embodiment.

Figure 12:
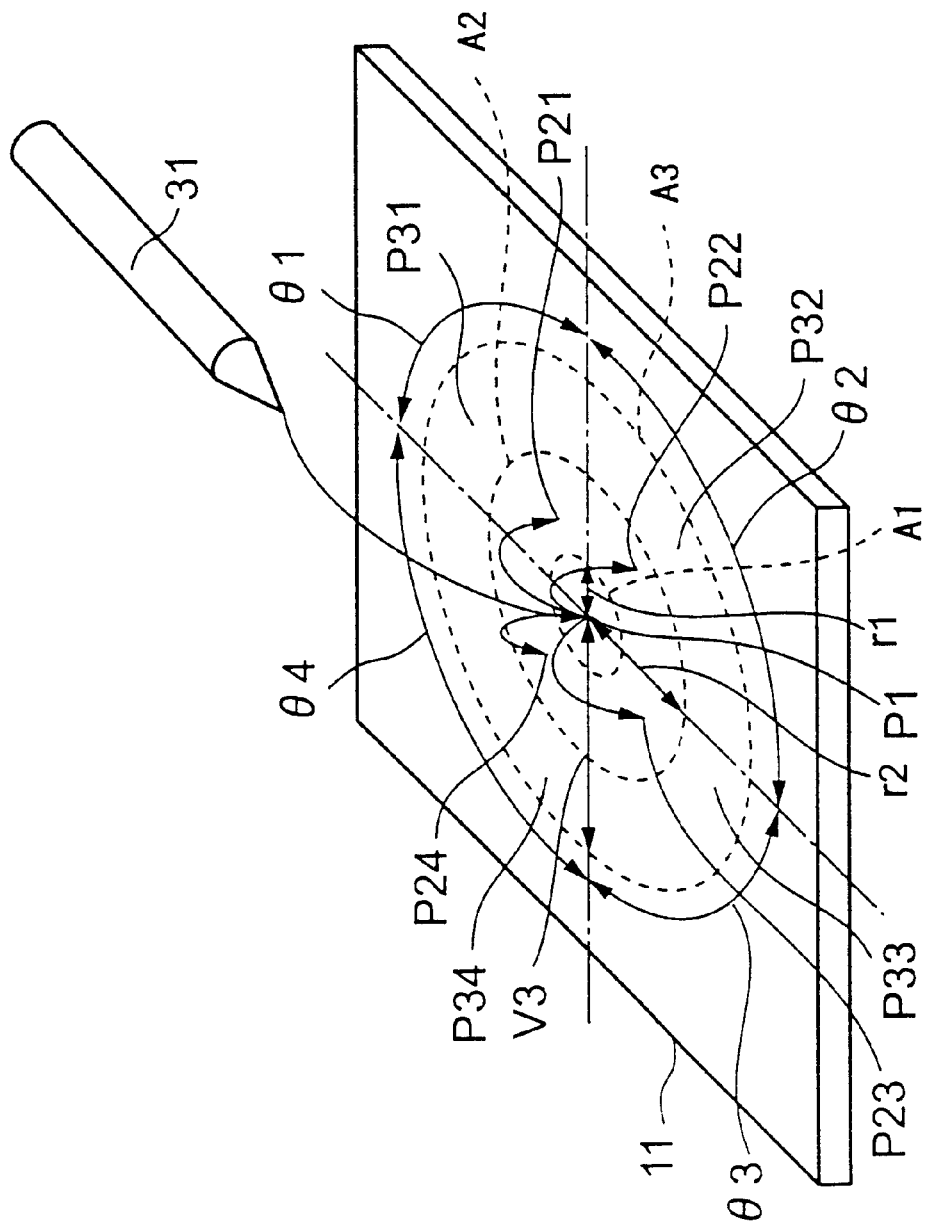
FIG. 12 is a schematic diagram showing operations of a first variant of the first embodiment of the present invention.

FIG. 12 is a schematic diagram showing operations of a first variant of the first embodiment of the present invention. As shown in the figure, areas A1 and A2 are divided into sectors having angles θ 1, θ 2, θ 3 and θ 4. In FIG. 12, point P1 in area A1 corresponds to the first touch of the pen 31 on the touch screen 11. Points P21 through P24 are located in area A2 and outside area A1. If the second touch is at point P21, the operation is regarded as a right button single click operation. If the second touch is at point P22, the operation is regarded as a first operation. If the second touch is at point P23, the operation is regarded as a second operation. If the second touch is at point P24, the operation is regarded as a third operation.

Further, an area A3 having a radius r3 may be provided so as to achieve an increased number of operations. FIG. 12 shows points P31 through P34 located in area A3 and outside area A2.

Also, in order to identify a right button single click operation, it is sufficient to recognize an operation different from the double click operation. Therefore, for example, an operation including a first touch followed by a release and a second touch kept in contact over a predetermined time period may be regarded as a right button single click operation.

Figure 13:
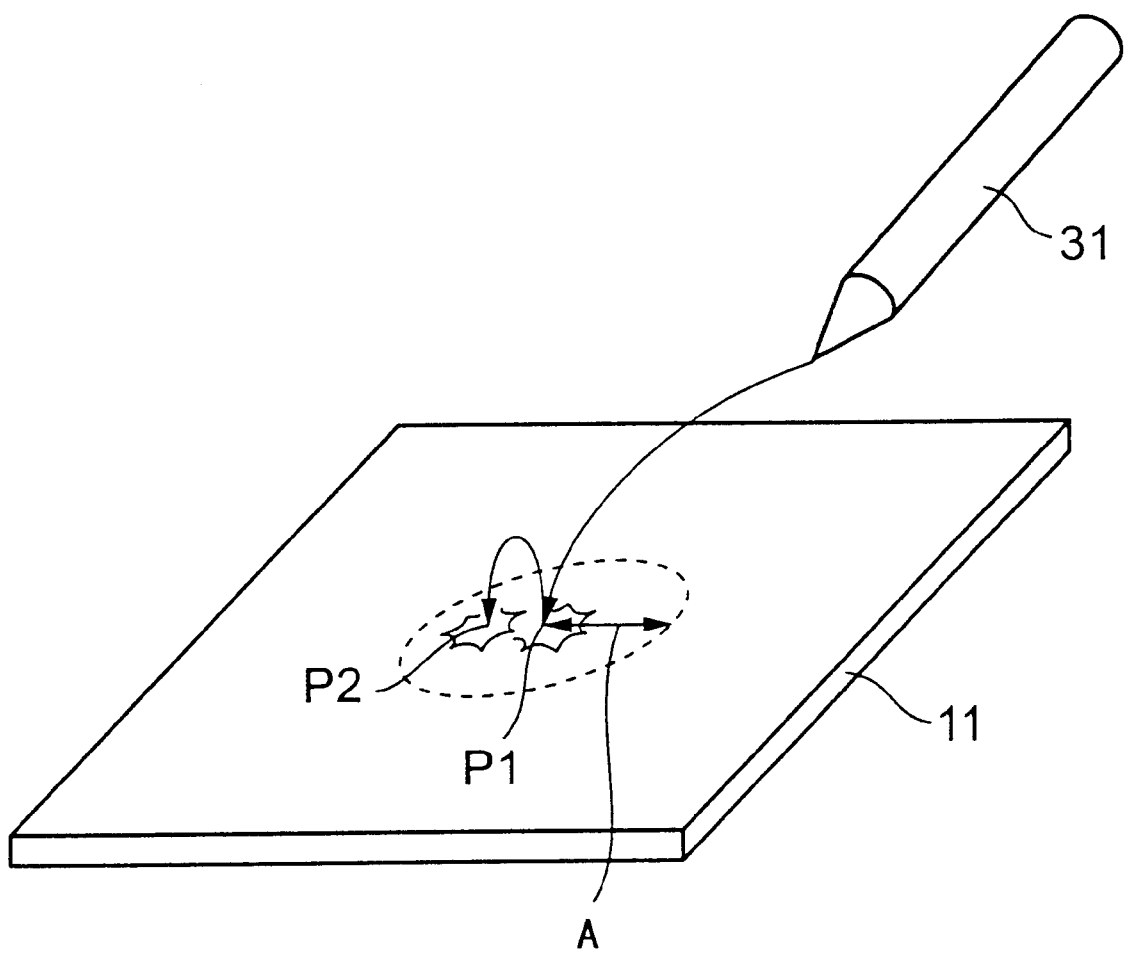
FIG. 13 is a schematic diagram showing an operation of a second variant of the first embodiment of the present invention.

FIG. 13 is a schematic diagram showing an operation of a second variant of the first embodiment of the present invention. Point P1 in area A corresponds to the first touch of the pen 31 on the touch screen 11. Then, a second touch is made at point P2 within area A and kept in contact over a predetermined time period. This operation is regarded as a right button single click operation.

Figure 14:
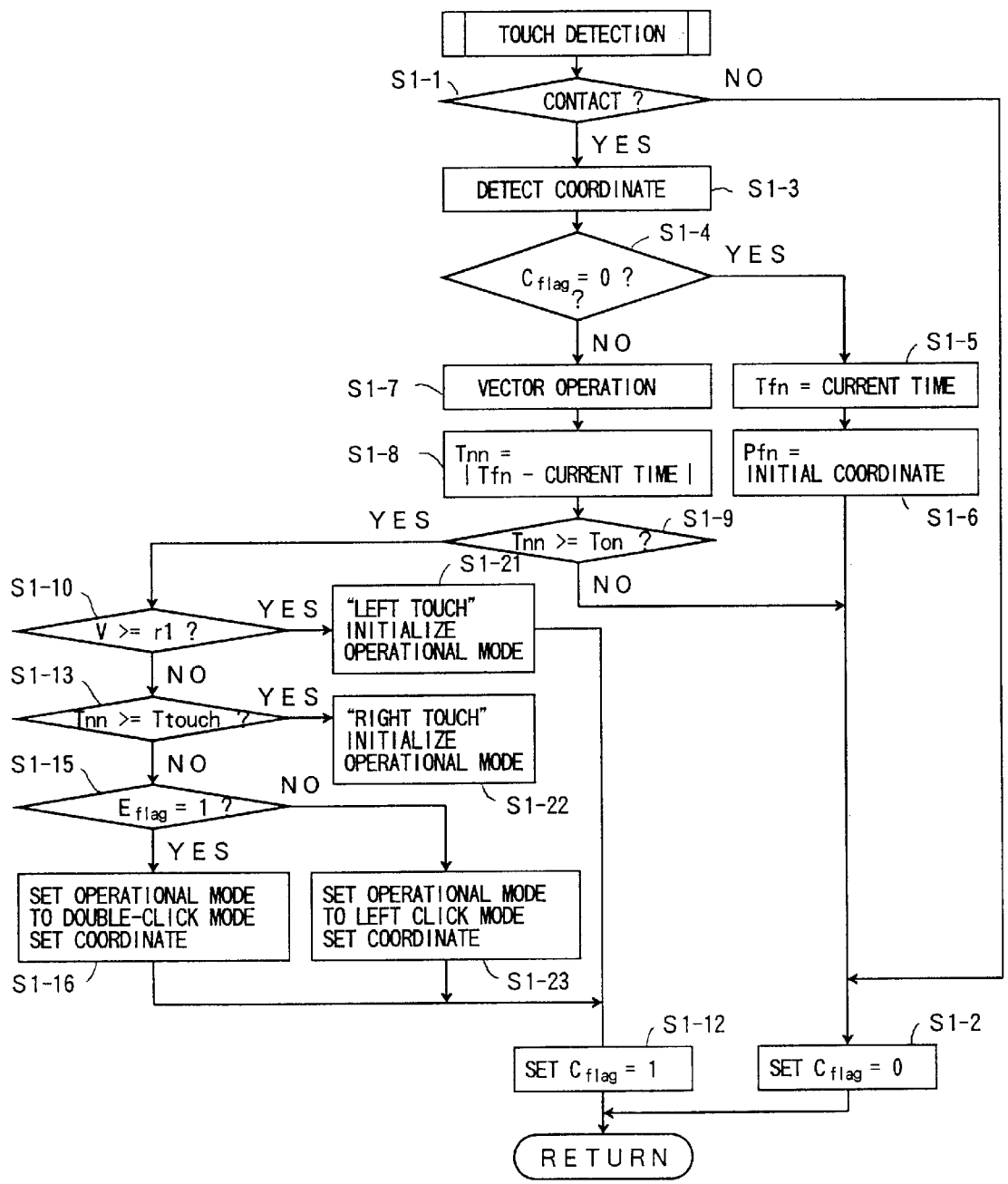
FIG. 14 is a detailed flowchart of a touch detection step of a third variant of the first embodiment of the present invention.
Figure 15:
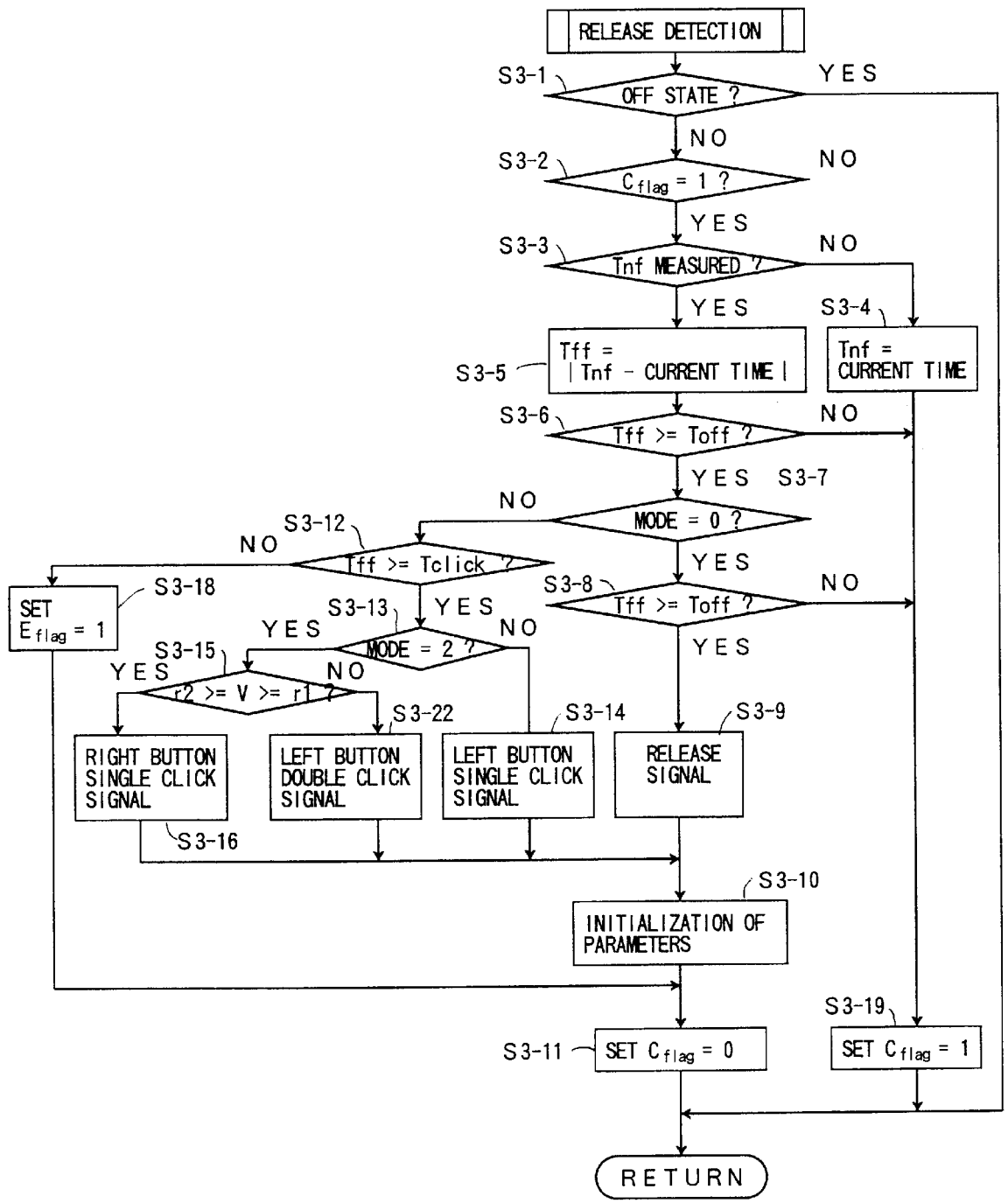
FIG. 15 is a detailed flowchart of a release detection step of a third variant of the first embodiment of the present invention.

FIG. 14 is a detailed flowchart of a touch detection step of a third variant of the first embodiment of the present invention. FIG. 15 is a detailed flowchart of a release detection step of a third variant of the first embodiment of the present invention. In FIGS. 14 and 15, steps similar to those of FIGS. 6 and 7 are indicated with similar reference numerals and will not be described in detail.

In the present embodiment, a touch signal produced at step S1-11 of FIG. 6 is replaced by a left touch signal produced at step S1-21 and a touch signal produced at step S1-14 of FIG. 6 is replaced by a right touch signal produced at step S1-22. Also, a click mode at step S1-17 of FIG. 6 is replaced by a left click mode at step S1-23. When the operational mode is set as a left click mode, when the result of S3-15 shown in FIG. 14 is negative, it is determined as a left button double click and a left button double click signal is produced (step S-22).

Figure 16:
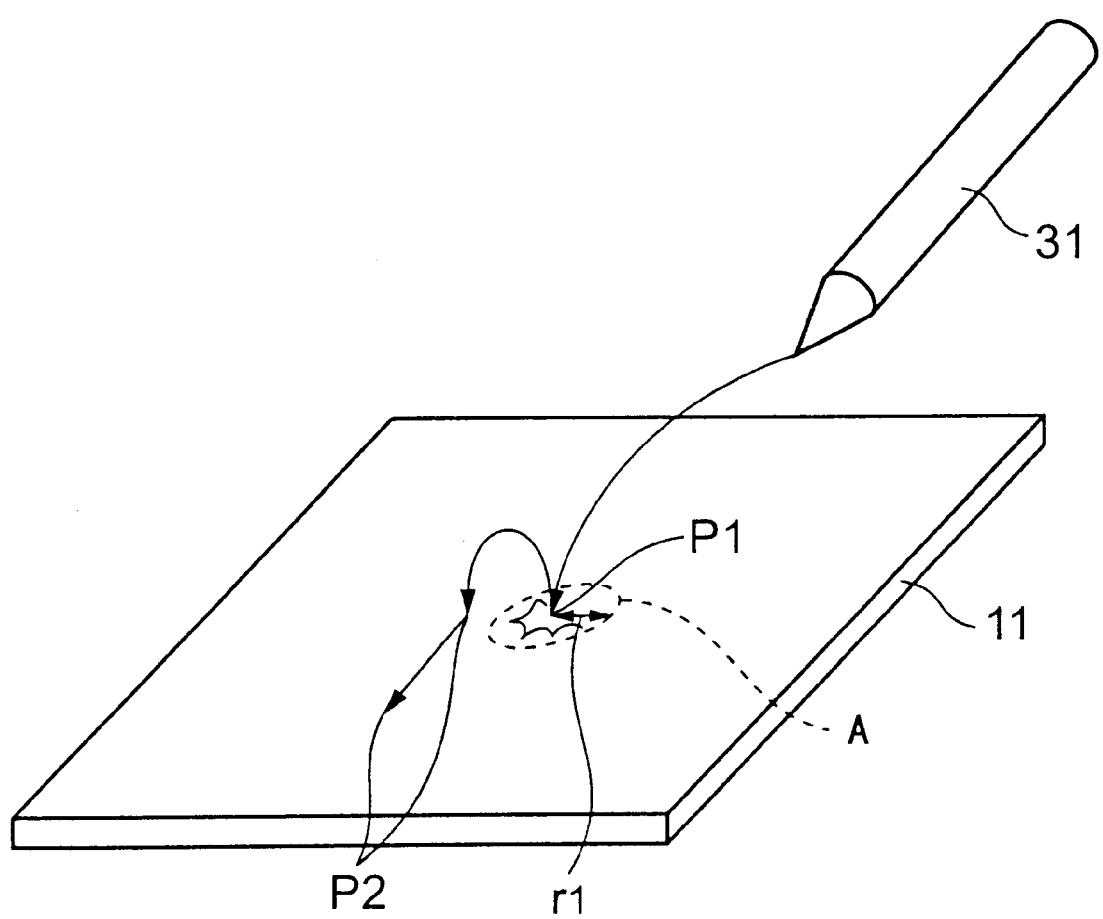
FIG. 16 is a schematic diagram showing a left touch output of the third variant of the first embodiment of the present invention.

FIG. 16 is a schematic diagram showing a left touch output of the third variant of the first embodiment of the present invention. In FIG. 16, point P1 in area A corresponds to the first touch of the pen 31 on the touch screen 11. Point P2 is located outside area A. Then, the operation is determined as a left touch and a left touch signal is produced.

Figure 17:
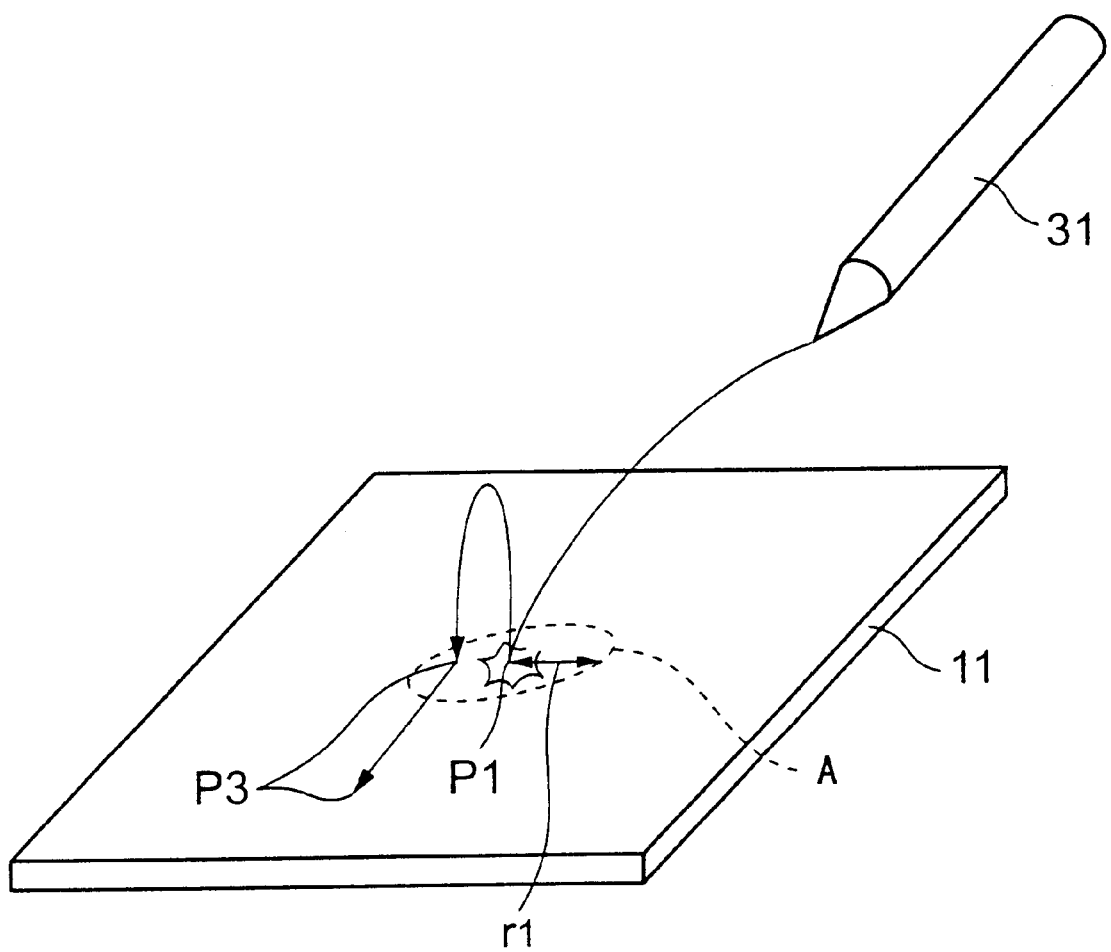
FIG. 17 is a schematic diagram showing a right touch output of the third variant of the first embodiment of the present invention.

FIG. 17 is a schematic diagram showing a right touch output of the third variant of the first embodiment of the present invention. In FIG. 17, point P1 in area A corresponds to the first touch of the pen 31 on the touch screen 11. Point P3 is located inside area A. Then, the operation is determined as a right touch and a right touch signal is produced.

In the first embodiment of the present invention, a right button click operation is determined at the MCU 13 of the touch panel unit 4. However, it is also possible to determine various operations by means of a software at the computer main body 2.

Figure 18:
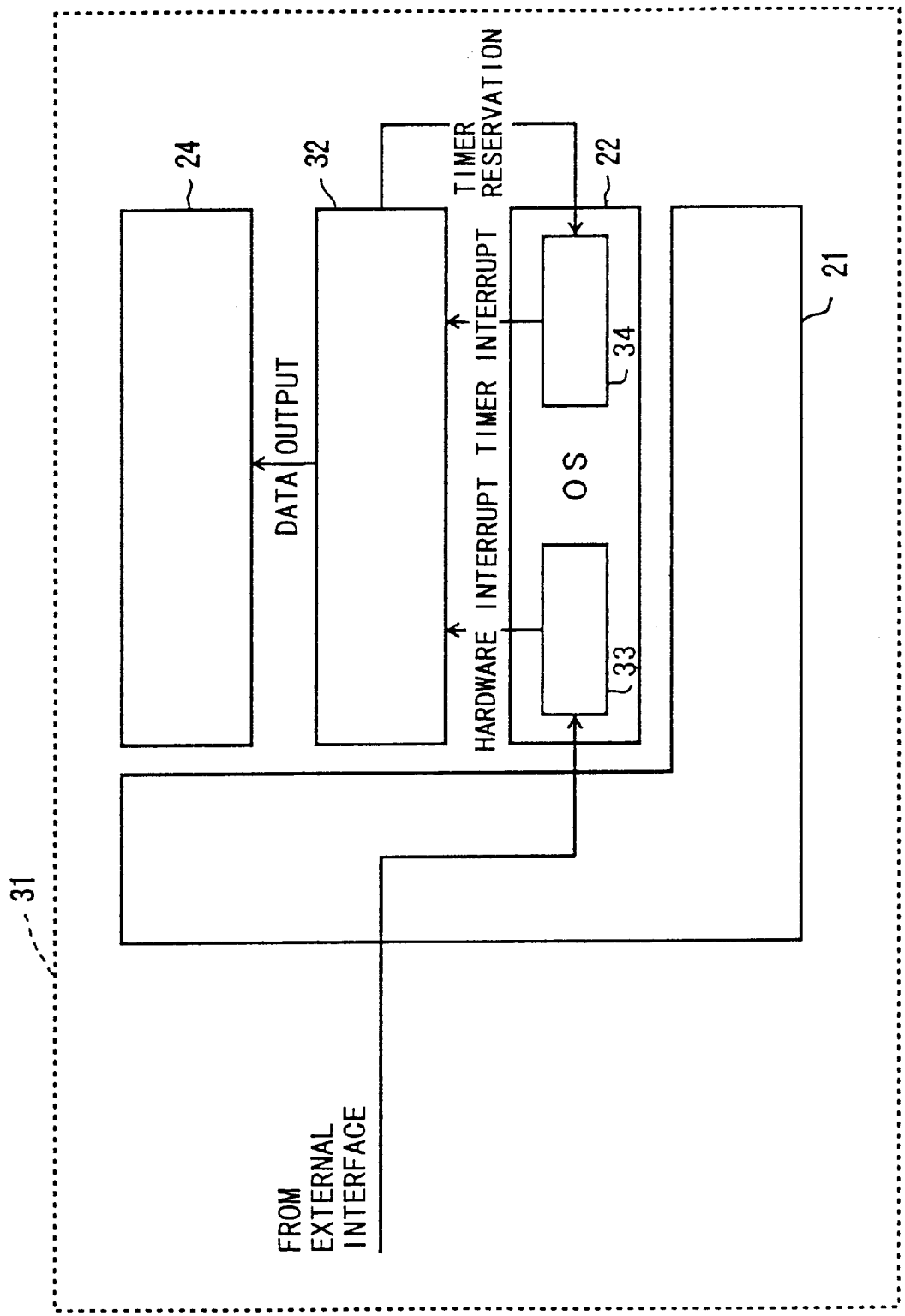
FIG. 18 is a block diagram showing a computer main body used with a coordinate input device of a second embodiment of the present invention.

FIG. 18 is a block diagram showing a computer main body used with a coordinate input device of a second embodiment of the present invention. In FIG. 18, components similar to those of FIG. 3 are indicated with similar reference numerals and will not be described in detail. In the present embodiment, various button operations are determined by means of a device driver 32 installed in a computer main body 31 instead of the MCU 13 of the touch screen unit 4.

The device driver 32 operates according to hardware interrupt supplied from an interrupt processing part 33 of the OS 22 and a timer interrupt supplied from a timer processing part 34 of the OS 22. When a coordinate data of a contact on the touch screen 11 is supplied from the touch screen unit 4, the interrupt processing part 33 causes a hardware interrupt on the device driver 32 and supplies an interrupt data.

FIG. 19 is a flowchart showing an operation of the device driver of the second embodiment of the present invention upon occurrence of a hardware interrupt. When there is a hardware interrupt from the OS 22, the device driver 32 checks and determines whether or not the interrupt data supplied from the touch screen unit 4 via the OS 22 is valid (steps S11-1, S11-2). If the result of step S1-12 is positive, the process proceeds to step S11-3.

At step S11-3, it is determined whether the previous data supplied from the touch screen unit 4 indicates an ON state of the touch screen 11. If the result of step S11-3 is positive, the process proceeds to step S11-4 to determine whether the current data supplied from the touch screen unit 4 indicates an ON state of the touch screen 11.

If the result of step S11-4 is negative, it can be determined that the touch screen 11 has changed its state from ON to OFF. Thus, an OFF state generation process (step S11-5) is implemented as will be described later.

If the result of step S11-4 is positive, it can be determined that the touch screen 11 remains in an ON state. Thus, an ON state continuation process (step S11-6) is implemented as will be described later.

If the result of step S11-3 is negative, the process proceeds to step S11-7 to determine whether the current data supplied from the touch screen unit 4 indicates an ON state of the touch screen 11.

If the result of step S11-7 is positive, it can be determined that the touch screen 11 has changed its state from OFF to ON. Thus, an ON state generation process (step S11-8) is implemented as will be described later.

If the result of step S11-7 is negative, it can be determined that the touch screen 11 remains in an OFF state. Thus, an OFF state continuation process (step S11-9) is implemented as will be described later.

Referring now to FIGS. 20 through 23 and to FIG. 4, the OFF generation process, the ON continuation process, the ON generation process and the OFF continuation process of FIG. 19 will be described in detail.

Figure 20:
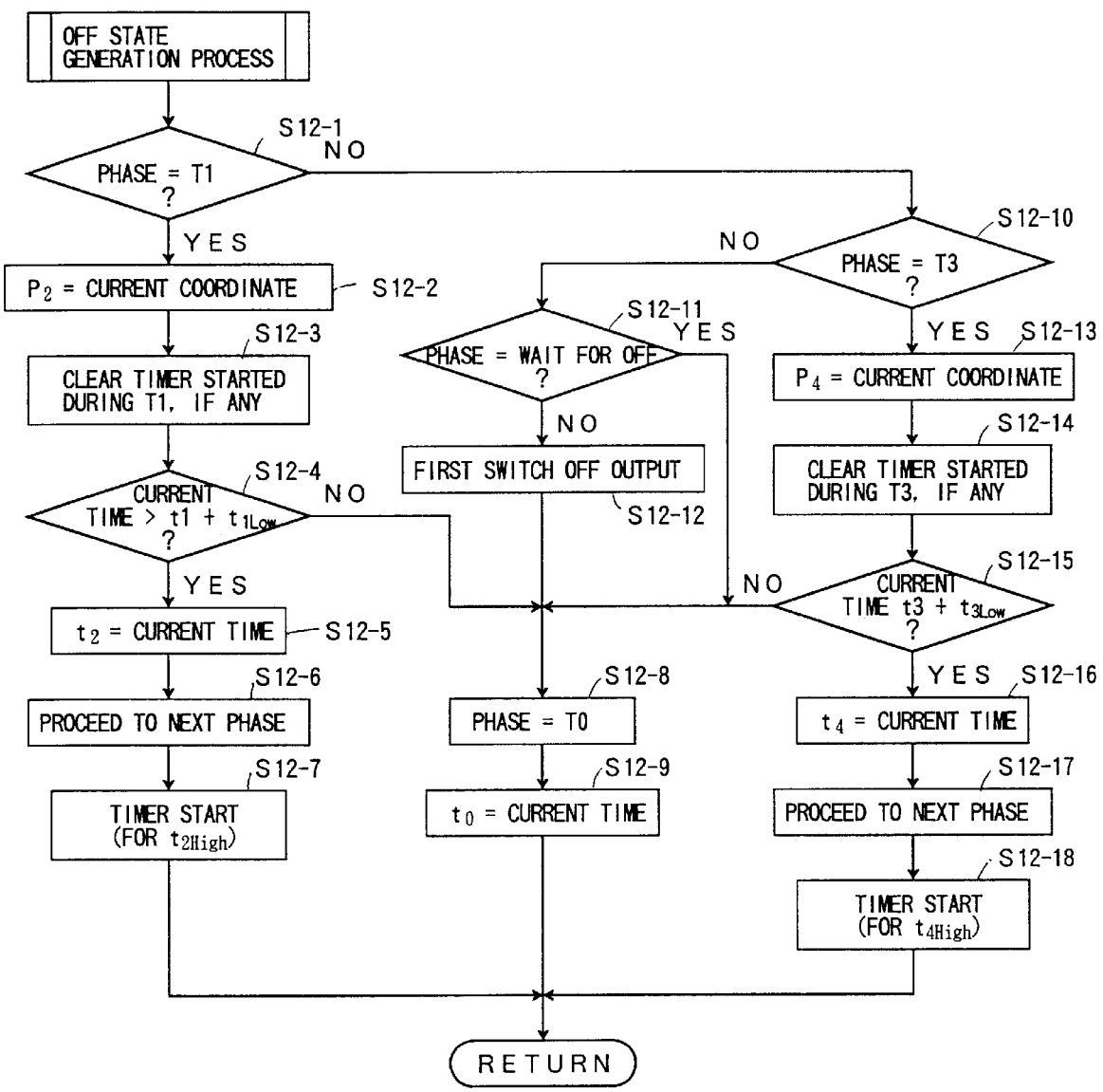
FIG. 20 is a flowchart showing an OFF generation process of FIG. 19.

FIG. 20 is a flowchart showing an OFF generation process of FIG. 19. First, at step S12-1, it is determined whether it is in an ON state. If an OFF state has occurred during phase T1 which is an ON state, the current coordinate detected at the touch screen unit 4 is set as $P_2$ (step S12-2). Then, the timer measuring the duration of phase T1 is cleared (step S12-3).

At step S12-4, it is determined whether current time exceeds phase T1 ($t1+t_{1Low}$). If the result of step S12-4 is positive, current time is set as t2 (step S12-5). Then, at step S12-6, it proceeds to the next phase, here phase T2 (step S12-6). Further, a timer is started to measure the predetermined timer period $T_{2high}$. Then, the process returns to the process shown in FIG. 19.

If the of result step S12-4 is negative, the there is a phase transition to phase T0 (initial OFF state) at step S12-8, and current time is set as $t_0$ (step S12-9). Then, the process returns to the process shown in FIG. 19.

At step S12-1, if it is determined that an OFF state has not occurred during phase T1, the process proceeds to step S12-10 to determine whether an OFF state occurred during phase T3.

If the result of step S12-10 is negative, that is to say it is determined if it is during one of phases T0, T2 and T4 in which an OFF state occurred, the process proceeds to step S12-11. At step S12-11, it is determined whether it is in WAIT FOR OFF phase. If the result of step S12-11 is positive, there is a phase transition to phase T0 (initial OFF state) at step S12-8, and current time is set as $t_0$ (step S12-9).

If the result of step S12-11 is negative, a left button off output is supplied to the application (step S12-12). Then, there is a phase transition to phase T0 (initial OFF state) at step S12-8, and current time is set as $t_0$ (step S12-9).

If at step S12-10, phase T3 which is a second ON state, the current coordinate detected at the touch screen unit 4 is set as $P_4$ (step S12-13). Then, the timer measuring the duration of phase T3 is cleared (step S12-14).

At step S12-15, it is determined whether current time, that is to say the time where the touch screen 11 has changed from ON state to OFF state, exceeds phase T3 ($t3+t_{3Low}$). If the result of step S12-15 is negative, there is a phase transition to phase T0 (initial OFF state) at step S12-8, and current time is set as to (step S12-9).

If the result of step S12-15 is positive, current time is set as t4 (step S12-16). Then, at step S12-17, it is proceeded to the next phase, here phase T4 (step S12-17). Further, a timer is started to measure the predetermined timer period $T_{4high}$. Then, the process returns to the process shown in FIG. 19.

Figure 21:
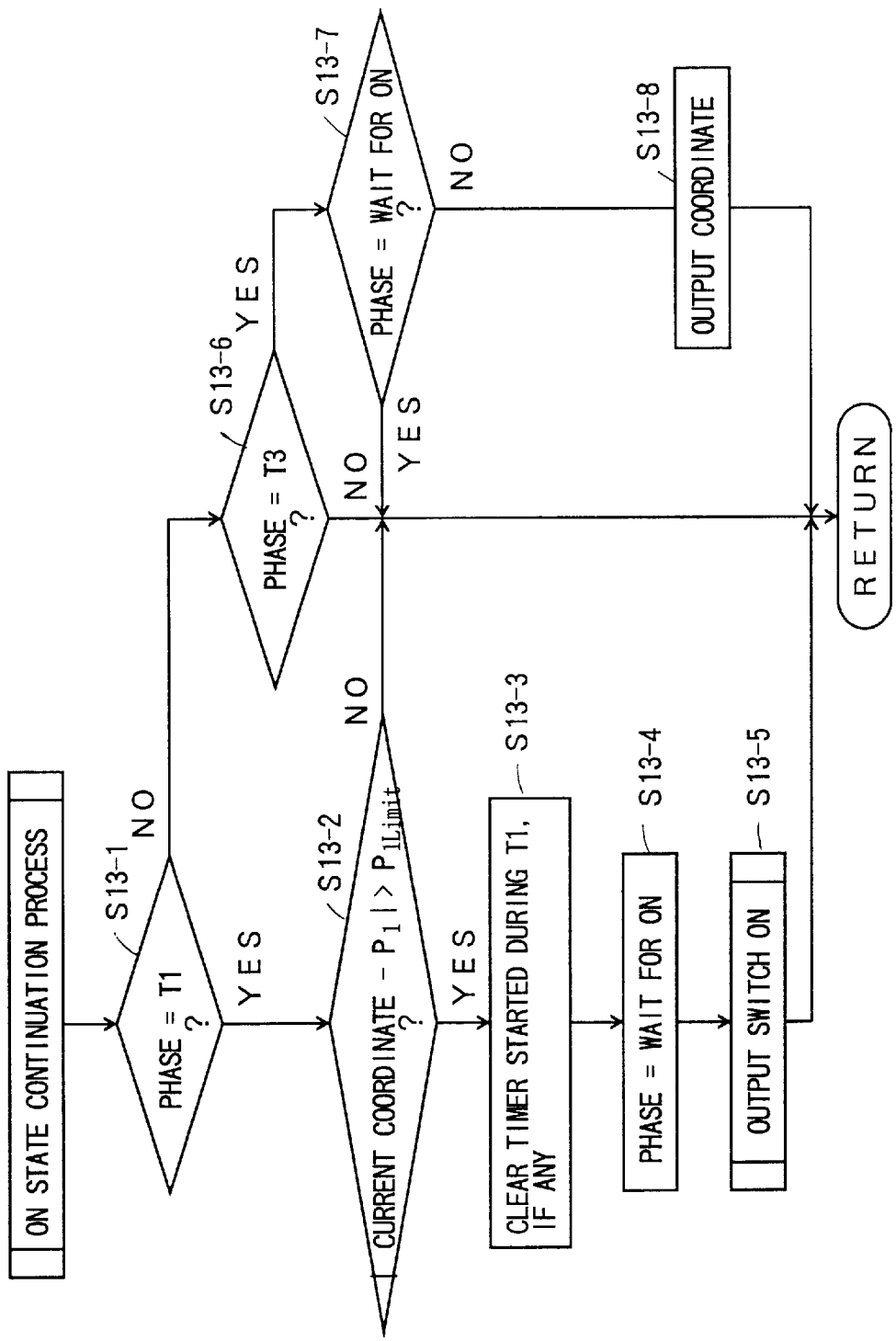
FIG. 21 is a flowchart showing an ON continuation process of FIG. 19.

FIG. 21 is a flowchart showing an ON continuation process of FIG. 19. First, at step S13-1, it is determined whether phase T1 is an ON state. If the result of step S13-1 is positive, the process proceeds to step S13-2. At step S13-2, it is determined whether the difference between current coordinate and the initial coordinate $P_1$ at the beginning of phase $T_1$ is greater than a predetermined area $P_{1Limit}$.

If the result of step S13-2 is positive, the timer measuring the duration of phase T1 is cleared (step S13-3). Then, there is a phase transition to WAIT FOR ON phase at step S13-4. Then, for example a left button switch ON is output (step S13-5). If the result of step S13-2 is negative, the process returns to the process shown in FIG. 19.

If, at step S13-1, it is determined that it is not in phase T1, the process proceeds to step S13-6. At step S13-6, it is determined whether it is in phase T3. If the result of S13-6 is positive, the process proceeds to step S13-7 to determine whether the phase is in the WAIT FOR ON phase. If it is in the WAIT FOR ON phase, the process returns to the process shown in FIG. 19. If the result of step S13-8 is negative, the coordinate is output at step S13-8.

Thus, a left button ON and a left button touch can be detected.

FIG. 22 is a flowchart showing an ON generation process of FIG. 19. When there is a state transition from OFF state to ON state, at step S14-1, it proceeds to the next phase (i.e., from phase T0 to phase T1, or, from phase T2 to phase T3).

At step S14-2, it is determined whether the phase has proceeded to phase T1. If the result of step S14-2 is positive, current time is set as t1 and current coordinate is set as $P_1$ (step S14-3). Then at step S14-4, it is determined whether time t1 is within phase T0 (t0+$t_{1low}$).

If the result of step S14-4 is positive, current coordinate P0 is output at step S14-5, and a timer measuring the duration of phase T1 is started at step S14-6.

If the result of step S14-4 is negative, current coordinate P0 is output at step S14-7. Then a first button switch ON is output (step S14-8). There is a phase transition to WAIT FOR OFF phase at step S14-9 and the process returns to the process shown in FIG. 19.

If, at step S14-2, it is determined that it is not in phase T1, the process proceeds to step S14-10 to determine whether it is in phase T3.

If the result of step S14-10 is positive, current time is set as t3 and current coordinate is set as $P_3$ (step S14-11). Then, the timer measuring the duration of phase T2 is cleared (step S14-12). Then at step S14-13, it is determined whether time t3 is within phase T2 (t2+$t_{2low}$).

If the result of step S14-13 is positive, a timer is started to measure the predetermined timer period $T_{3high}$ (step S14-14). Then, the process returns to the process shown in FIG. 19.

If the result of step S14-13 is negative, there is a phase transition to phase T1 at step S14-15. Then, current time is set as t1 and current coordinate is set as $P_1$ (step S14-16). The process proceeds to S14-5 and S15-6 described above.

If, at step S14-10, it is determined that the phase is not phase T3, current coordinate is output at step S14-17 and there is a phase transition to phase T0 at step S14-18.

Figure 23:
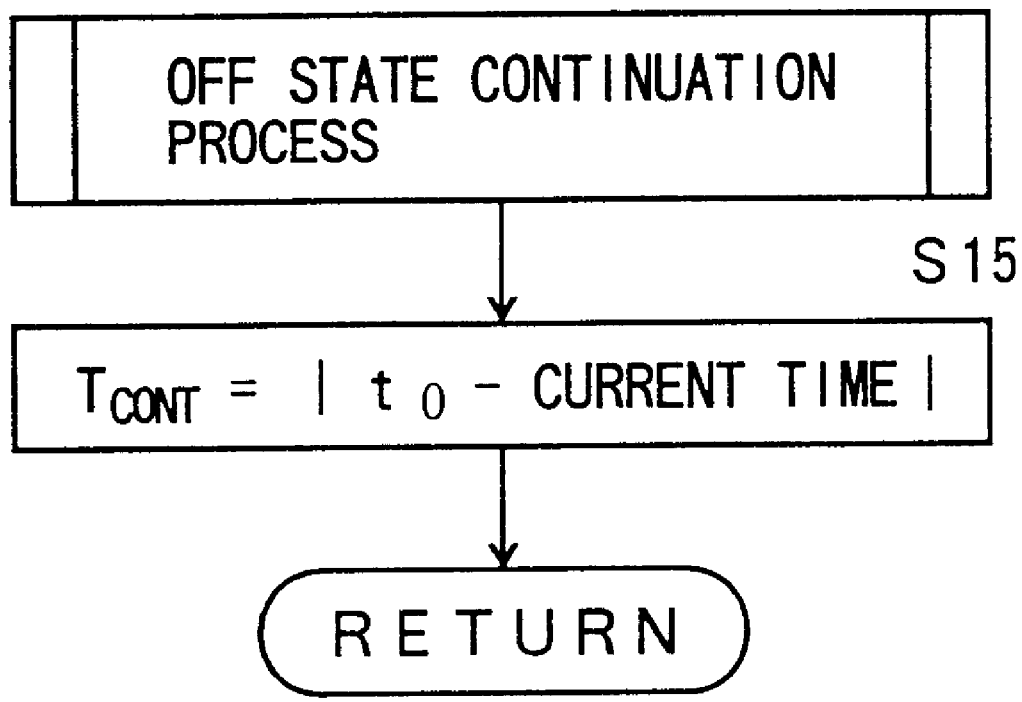
FIG. 23 is a flowchart showing an OFF continuation process of FIG. 19.

FIG. 23 is a flowchart showing an OFF continuation process of FIG. 19. At step S15, the duration of OFF $T_{CONT}$ is calculated by subtracting current time from OFF generation time t0. Then, the process returns to the process shown in FIG. 19.

Figure 24:
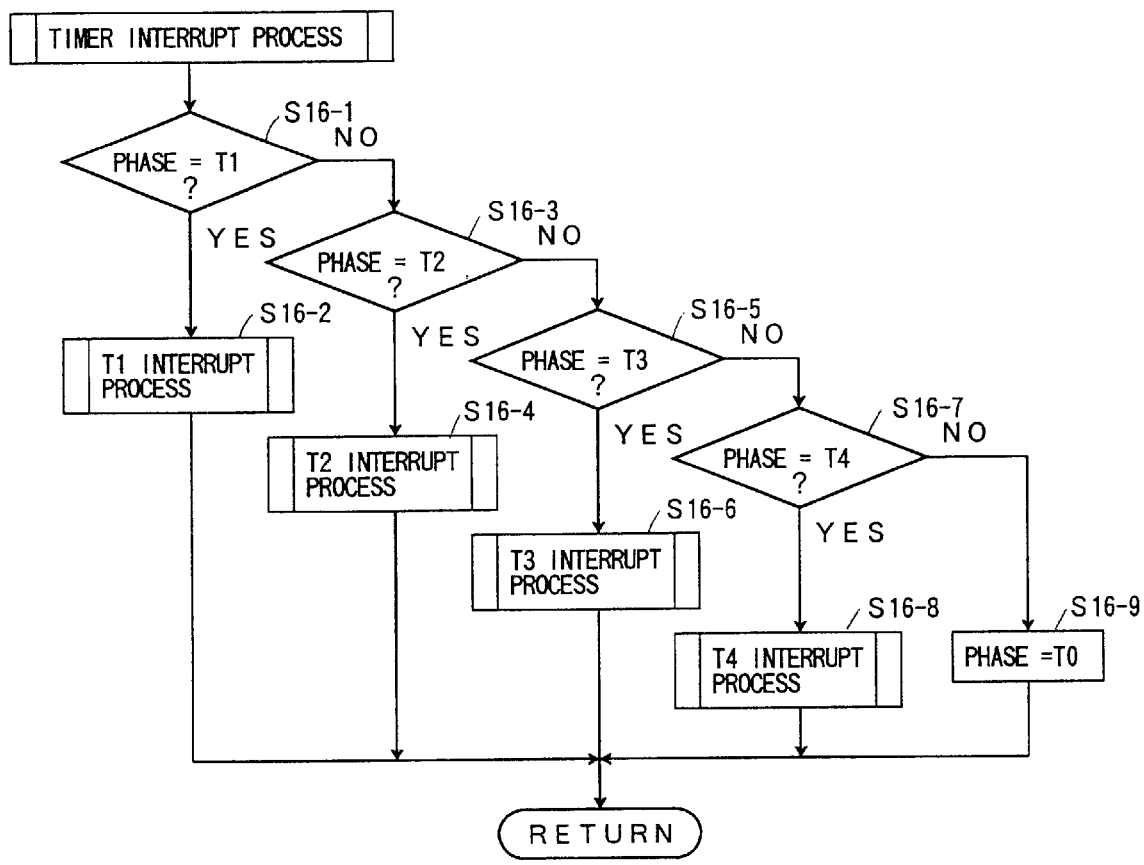
FIG. 24 is a flowchart showing a timer interrupt process of the second embodiment of the present invention.

Referring now to FIG. 24, a timer interrupt process of the second embodiment of the present invention will be described.

At step S16-1, it is determined whether the time measured by the timer has reached initial time t1 of phase T1. If the result of step S16-1 is positive, a T1 interrupt process is implemented at step S16-2. The T1 interrupt process will be described later with reference to FIG. 25. If the result of step S16-1 is negative, the process proceeds to step S16-3.

At step S16-3, it is determined whether the time measured by the timer has reached initial time t2 of phase T2. If the result of step S16-3 is positive, a T2 interrupt process is implemented at step S16-4. The T2 interrupt process will be described later with reference to FIG. 26. If the result of step S16-3 is negative, the process proceeds to step S16-5.

At step S16-5, it is determined whether the time measured by the timer has reached initial time t3 of phase T3. If the result of step S16-5 is positive, a T3 interrupt process is implemented at step S16-6. The T3 interrupt process will be described later with reference to FIG. 27. If the result of step S16-5 is negative, the process proceeds to step S16-7.

At step S16-7, it is determined whether the time measured by the timer has reached initial time t4 of phase T4. If the result of step S16-7 is positive, a T4 interrupt process is implemented at step S16-8. The T4 interrupt process will be described later with reference to FIG. 28. If the result of step S16-7 is negative, the process proceeds to step S16-9. At step S16-9, the time measured by the timer is set as the initial time t0 of phase T0.

Figure 25:
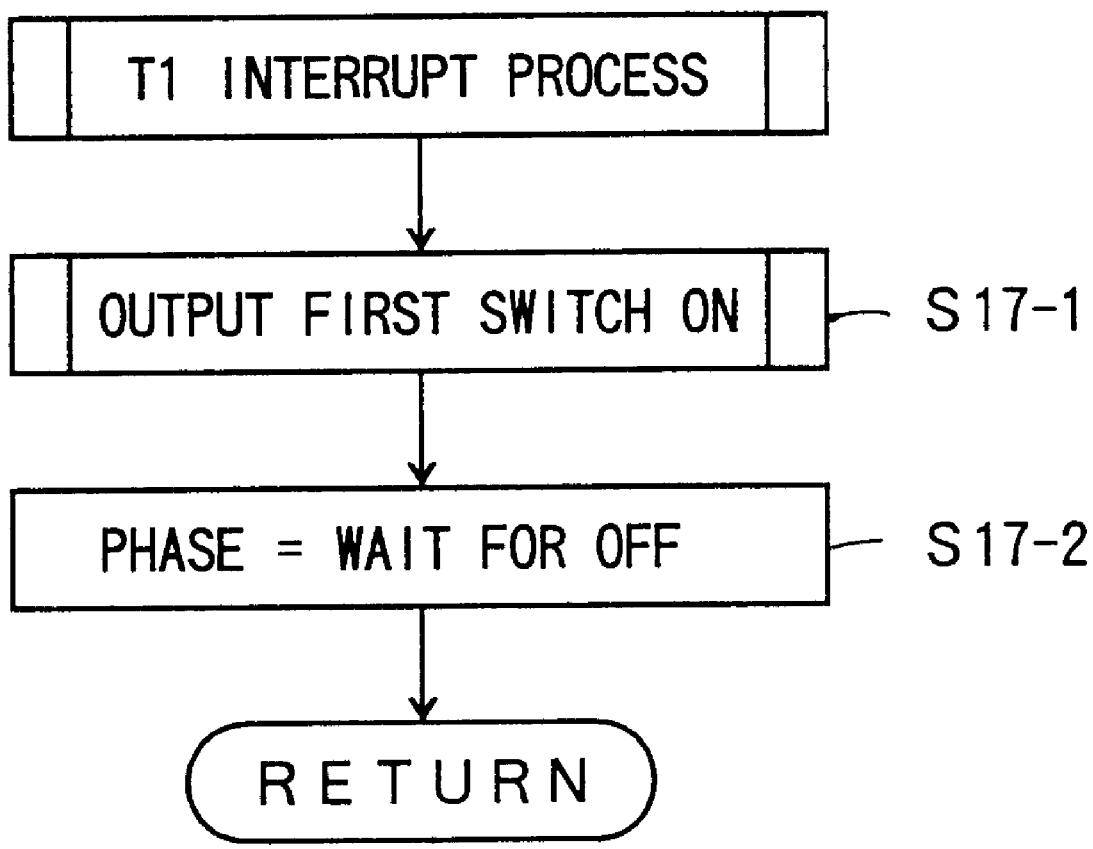
FIG. 25 is a flowchart showing a T1 interrupt process of FIG. 24.

FIG. 25 is a flowchart showing a T1 interrupt process (step S16-2) of FIG. 24. At step S17-1, a first switch ON is output. Then, there is a phase transition to WAIT FOR OFF phase (step S17-2). Thus, the T1 interrupt process can recognize that the switch has been turned ON.

Figure 26:
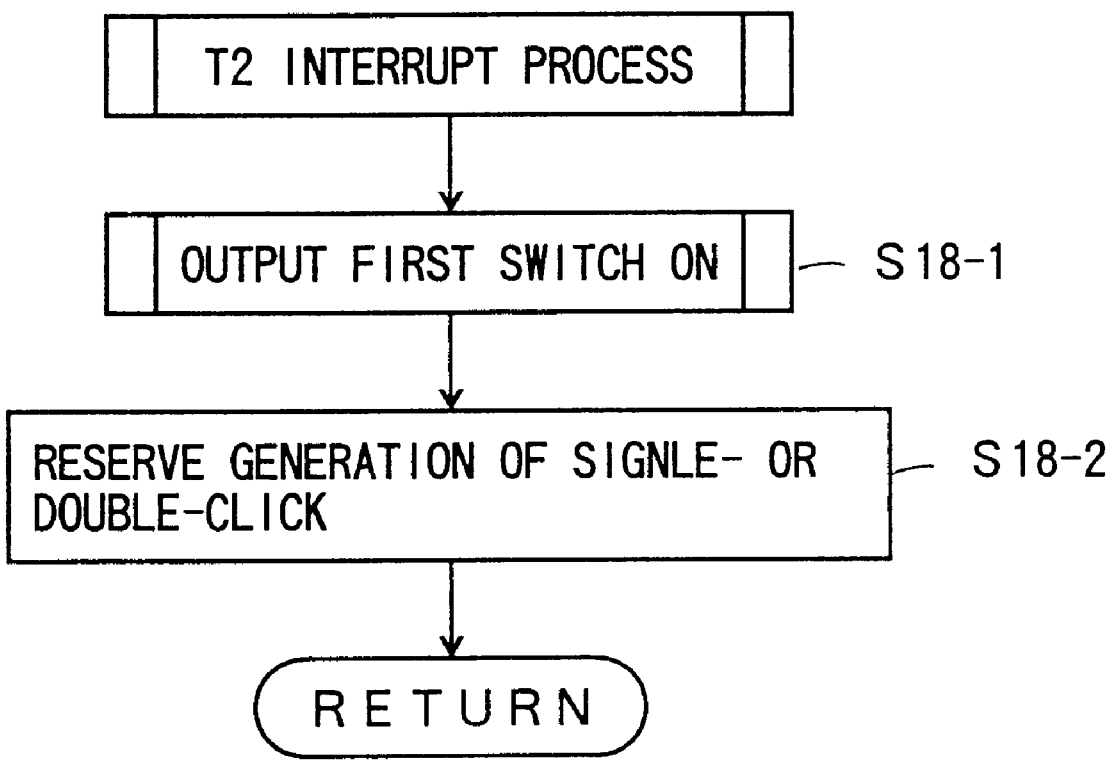
FIG. 26 is a flowchart showing a T2 interrupt process of FIG. 24.

FIG. 26 is a flowchart showing a T2 interrupt process (step S16-4) of FIG. 24. At step S18-1, a first switch ON is output. Then, a generation of a single click or double click is reserved for an ON state of the first switch (step S18-2). Thus, the T1 interrupt process can recognize that the first switch has been single clicked or double clicked.

Figure 27:
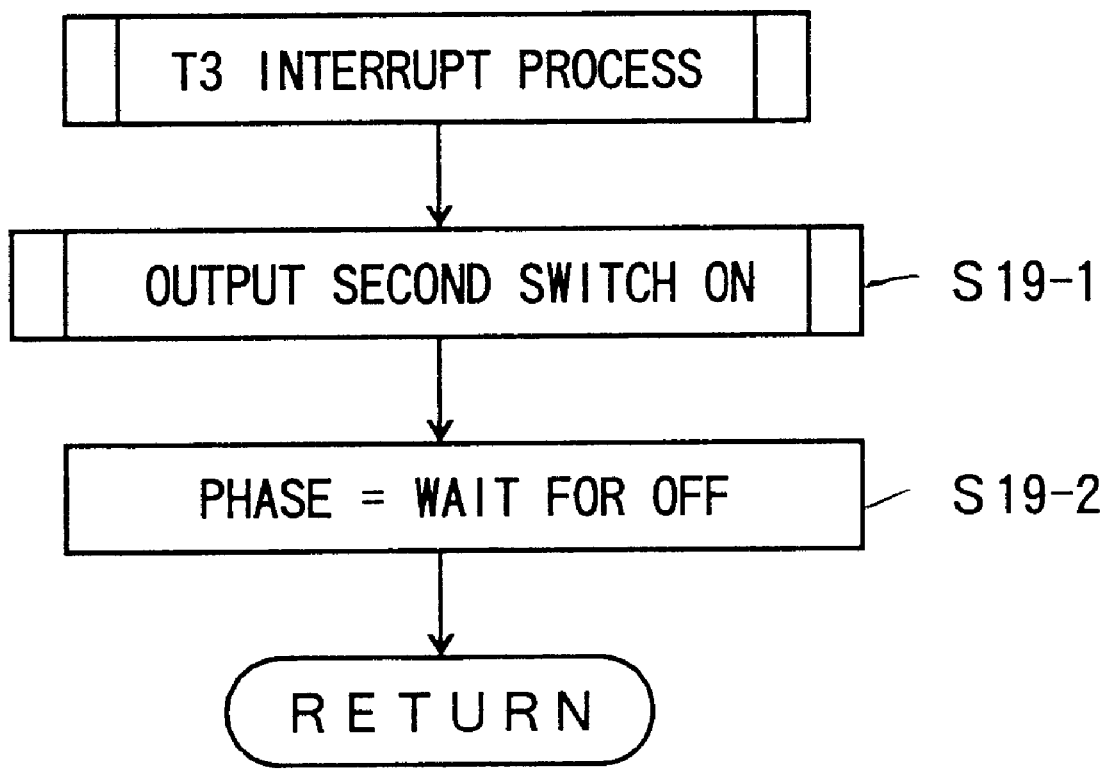
FIG. 27 is a flowchart showing a T3 interrupt process of FIG. 24.

FIG. 27 is a flowchart showing a T3 interrupt process (step S16-6) of FIG. 24. At step S19-1, a second switch ON is output. Then, if a switch corresponding to the right button of a mouse is turned ON, there is a phase transition to WAIT FOR OFF state (step S19-2). Thus, the second switch ON is output in the third interrupt process.

Figure 28:
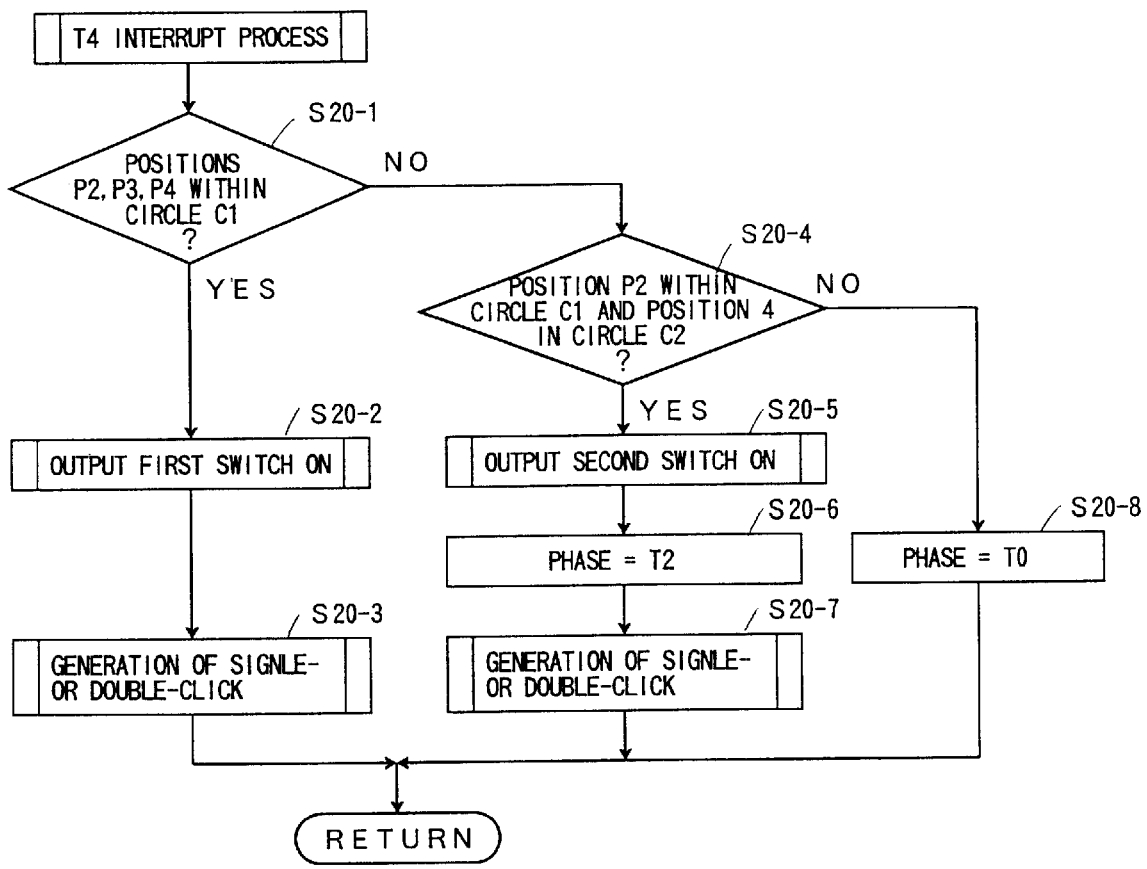
FIG. 28 is a flowchart showing a T4 interrupt process of FIG. 24.

FIG. 28 is a flowchart showing a T4 interrupt process (step S16-8) of FIG. 24. At step S20-1, it is determined whether positions P2, P3, and P4 at phases T2, T3 and T4, respectively, are located within a circle C1 of radius R1.

If the result of step S20-1 is positive, a switch corresponding to the left button of a mouse is output at step S20-2. Then, a single-click or a double-click is produced (step S20-3).

If the result of step S20-1 is negative, it is determined if position P2 at phase T2 is located within the circuit C1 of radius R1 and if position P4 at phase T4 is located within the circuit C2 of radius R2 (step S20-4).

If the result of step S20-4 is positive, a second switch ON process is implemented at step S20-5. At step S20-6, there is a phase transition to phase T2. Then, a single-click or a double-click is produced (step S20-7).

If the result of step S20-4 is negative, it is determined that there is no switch operation, and there is a phase transition to phase T0 (step S20-8).

Figure 29:
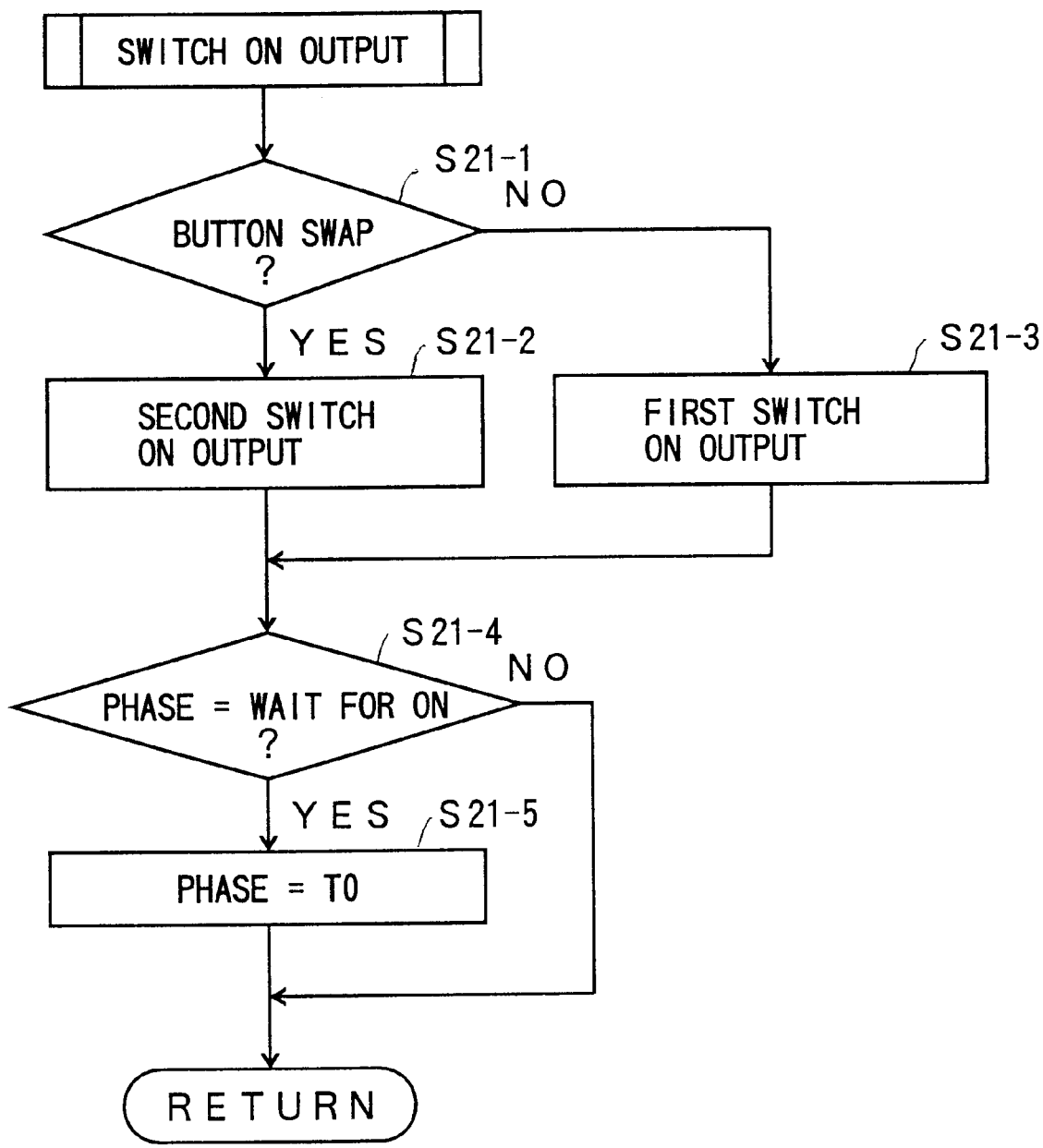
FIG. 29 is a flowchart showing a switch ON output process.

Referring to FIG. 29, the switch on process of step S13-5 shown in FIG. 21 will be described. At step S21-1, it is determined whether there has been a button swap operation. If the detected position is within the circle C1 of radius R1, it is determined that there is no button swap operation. If the detected position is outside the circle C1 of radius R1, it is determined that there is a button swap operation.

If the result of step S21-1 is positive, the second switch is turned ON at step S21-2. If the result of step S21-1 is negative, the first switch is turned ON at step S21-3. After steps S21-2 and S21-3, it is determined whether the phase is in a WAIT FOR ON phase (step S21-4). If the result of step S21-4 is positive, there is a phase transition to phase T0 at step S21-5. If the result of step S21-4 is negative, the process directly returns. Thus, either the first switch or the second switch is turned ON.

Figure 30:
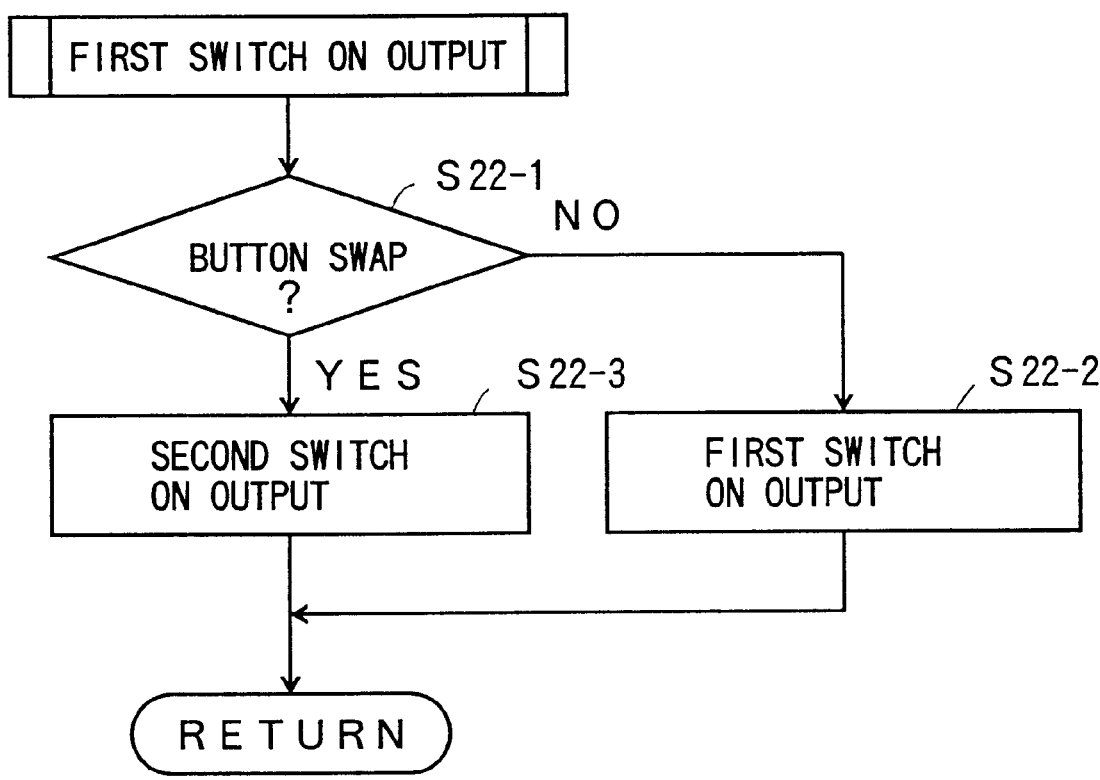
FIG. 30 is a flowchart showing a first switch ON output process.

FIG. 30 is a flowchart showing a first switch ON output process. The first switch ON output process corresponds to step S14-8 shown in FIG. 22, step S17-1 shown in FIG. 25, step S18-1 shown in FIG. 26 and step 20-2 shown in FIG. 28.

In the first switch ON output process, it is determined whether there is a button swap (step S22-1). If the result of step S22-1 is negative, the first switch is turned ON (step S22-2). If the result of step S22-1 is positive, the second switch is turned ON (step S22-3).

Figure 31:
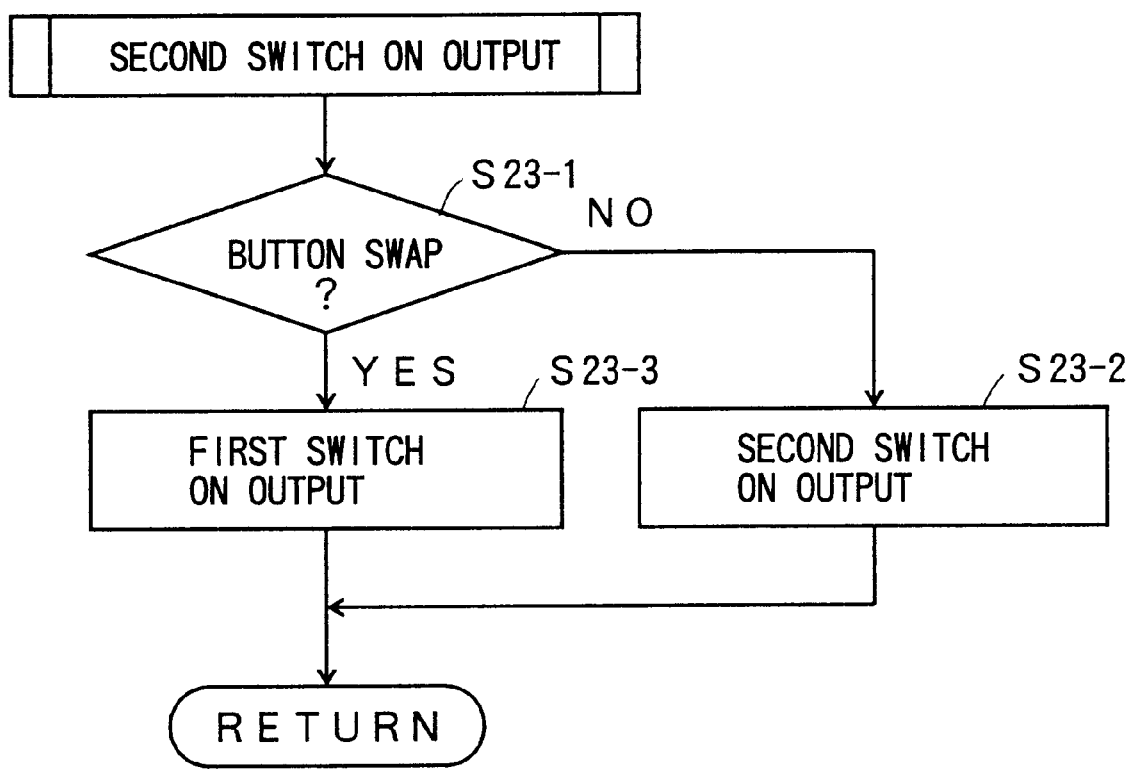
FIG. 31 is a flowchart showing a second switch ON output process.

FIG. 31 is a flowchart showing a second switch ON output process. The second switch ON output process corresponds to step S19-1 shown in FIG. 27 and step S20-5 shown in FIG. 28.

In the second switch ON output process, it is determined whether there is a button swap (step S23-1). If the result of step S23-1 is negative, the second switch is turned ON (step S23-2). If the result of step S23-1 is positive, the first switch is turned ON (step S22-3).

Figure 32:
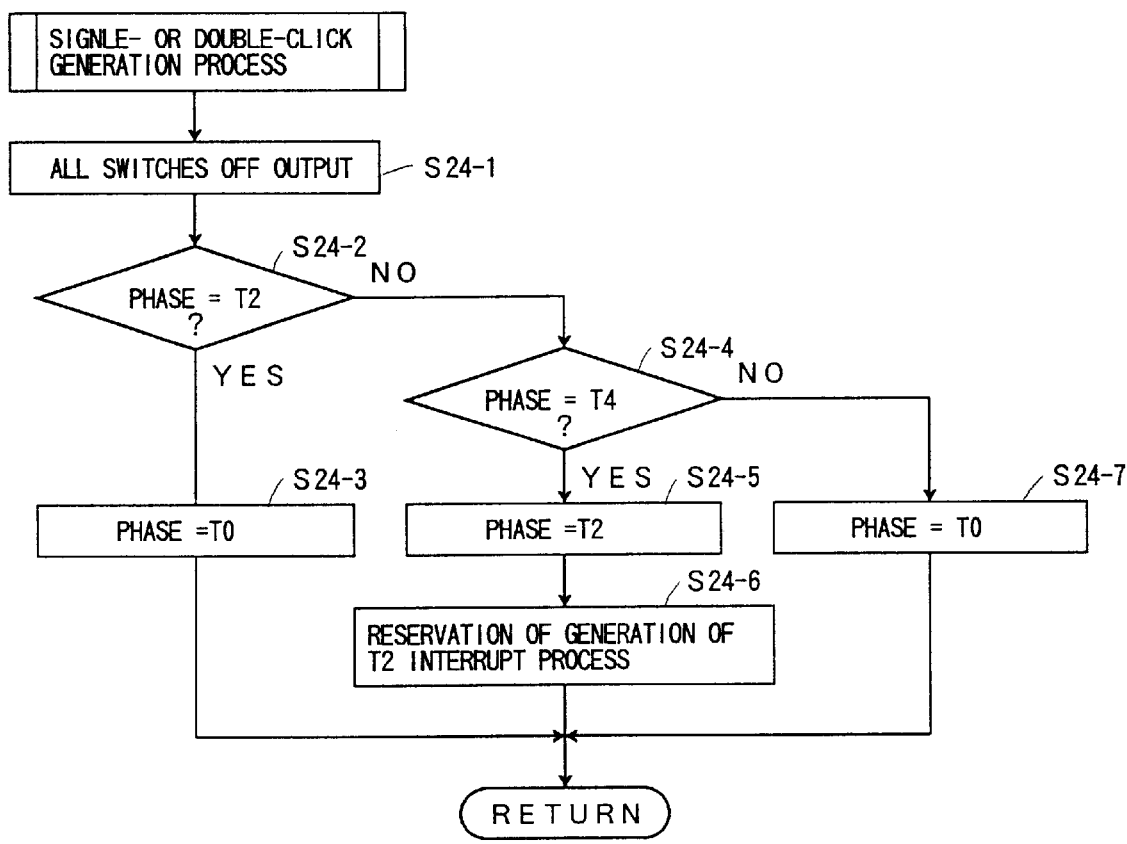
FIG. 32 is a flowchart showing a single-click or double-click generation process.

FIG. 32 is a flowchart showing a single-click or double-click generation process. The single-click or double-click generation process corresponds to steps S20-3 and S20-7 shown in FIG. 28.

In the single-click or double-click generation process, an OFF is output for all switches (step S24-1). Then, at step S24-2, it is determined whether the OFF state of step S24-1 is in phase T2. If the result of step S24-2 is positive, there is a phase transition to phase T0 (step S24-3). If the result of step S24-2 is negative, the process proceeds to step S24-4.

At step S24-4, it is determined whether the OFF state of step S24-1 is in phase T4. If the result of step S24-4 is positive, the phase is returned to phase T2 (step S24-5). Then, at step S24-6, a generation of the T2 interrupt process (see FIG. 25) is reserved. If the result of step S24-4 is negative, there is a phase transition to phase T0 (step S24-7). Accordingly, a generation of a single-click or double-click is reserved.

Figure 33:
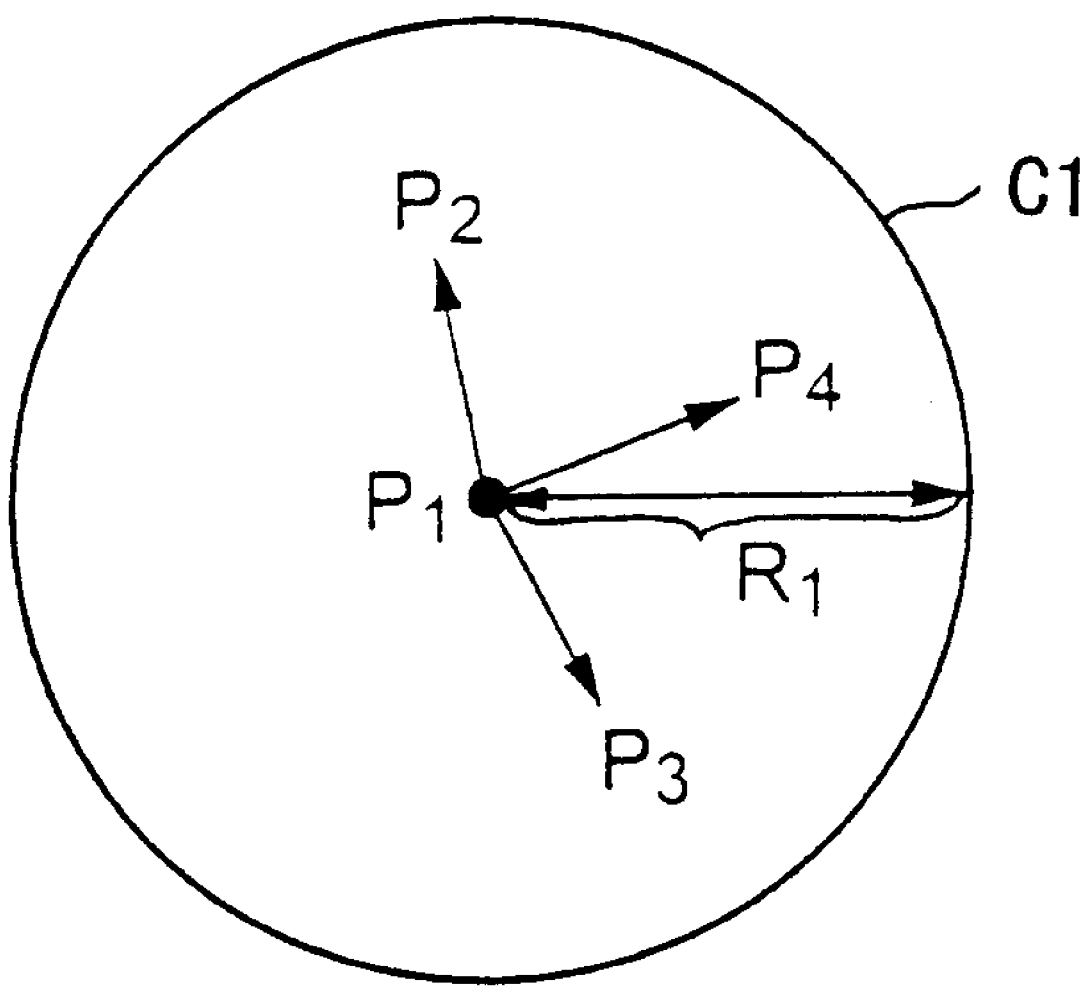
FIG. 33 is a schematic diagram showing a left button click operation of the second embodiment of the present invention.
Figure 34:
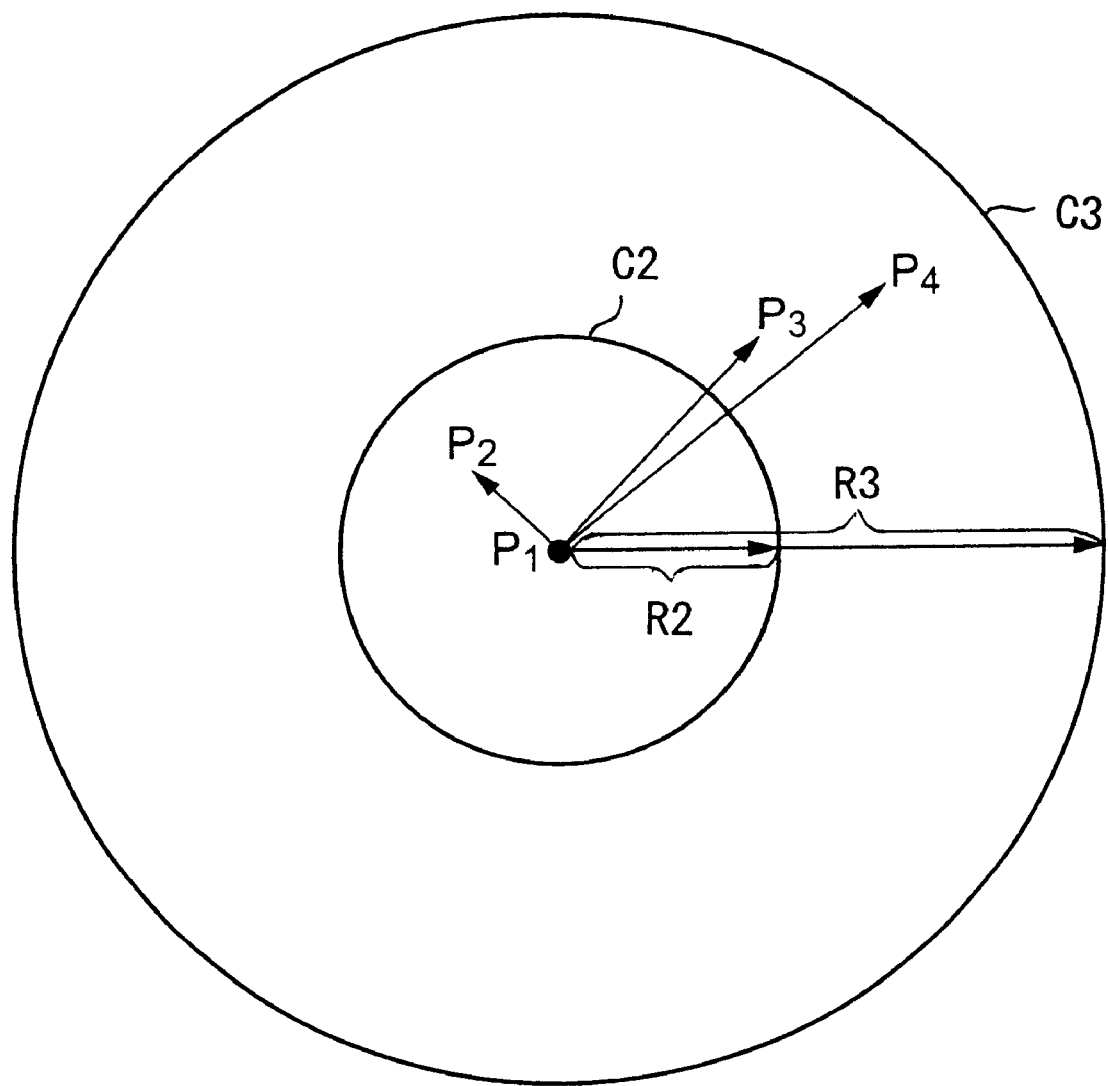
FIG. 34 is a schematic diagram showing a right button click operation of the second embodiment of the present invention.
Figure 35:
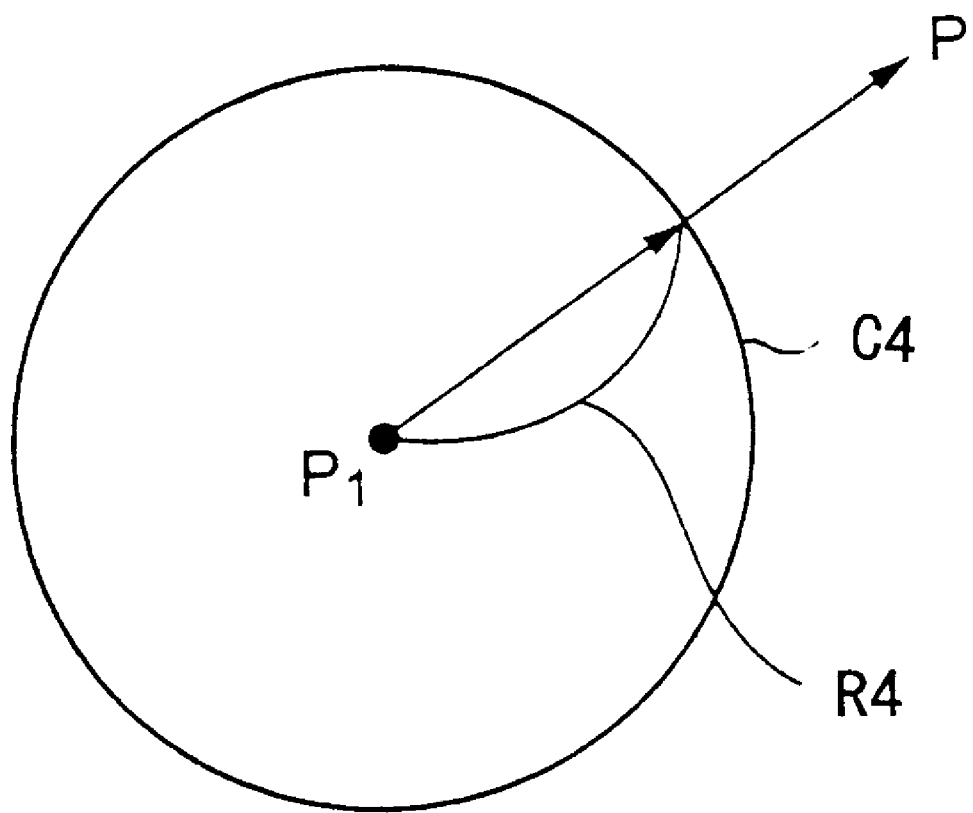
FIG. 35 is a schematic diagram showing a drag operation of the second embodiment of the present invention.

Referring now to FIGS. 33 through 35 and also to FIG. 4, various operations carried out in the second embodiment of the present invention will be described.

FIG. 33 is a schematic diagram showing a left button click operation of the second embodiment of the present invention. During phase T0, there is a touch on the touch screen 11 at position P1. The position P1 is illustrated as a center of a circle C1 of radius R1. Then, there is a phase transition to phase T1. During phase T1, there is a release at position P2 within a circle C1 of radius R1 having position P1 as the center. Then, there is a phase transition to phase T2. Then, time $t_{2high}$ is elapsed while in a released state and there is a phase transition to phase T0. Such operation is regarded as a single click of the left button of a mouse.

Also, during phase T2 and before time $t_{2high}$, if there is a touch on the touch screen 11 at position P3 within the circle C1, there is a phase transition to phase T3. During phase T3 and before time $t_{3high}$, if there is a release on the touch screen 11 at position P4 in the circle C1, there is a phase transition to phase T4. During T4 and before $t_{4high}$, if there is no further touch, the operation is regarded as a double click of the left button of a mouse.

FIG. 34 is a schematic diagram showing a right button click operation of the second embodiment of the present invention. During phase T0, there is a touch on the touch screen 11 at position P1. The position P1 is illustrated as a center of a circle C2 of radius R2 and of a circle C3 of radius R3. Then, there is a phase transition to phase T1. If there is a release on the touch screen 11 at position P2 in the circle C2, there is a phase transition to phase T2. During phase T2 and before time $t_{2high}$, if there is a touch on the touch screen 11 at position P3 outside the circle C2 and within the circle C3, there is a phase transition to phase T3. During phase T3 and before time $t_{3high}$, if there is a release on the touch screen 11 at position P4 in the circle C2, there is a phase transition to phase T4. During T4 and before $t_{4high}$, if there is no further touch, the operation is regarded as a single click of the right button of a mouse.

FIG. 35 is a schematic diagram showing a drag operation of the second embodiment of the present invention. During phase T0, there is a touch on the touch screen 11 at position P1. The position P1 is illustrated as a center of a circle C4 of radius R4. Then, there is a phase transition to phase T1. During phase T1 and before time $t_{1high}$, if the point P1 is brought outside circle C4 while keeping in contact with the touch screen 11, the operation is not regarded as a click.

In order to determine a single click of the right button, in FIGS. 33 through 35, together with the timing of the touch and/or release, it is detected whether touch and/or release has occurred inside or outside a predetermined area. It is to be noted that an increased number of functions can be achieved by providing predetermined angular regions about position P1.

Figure 36:
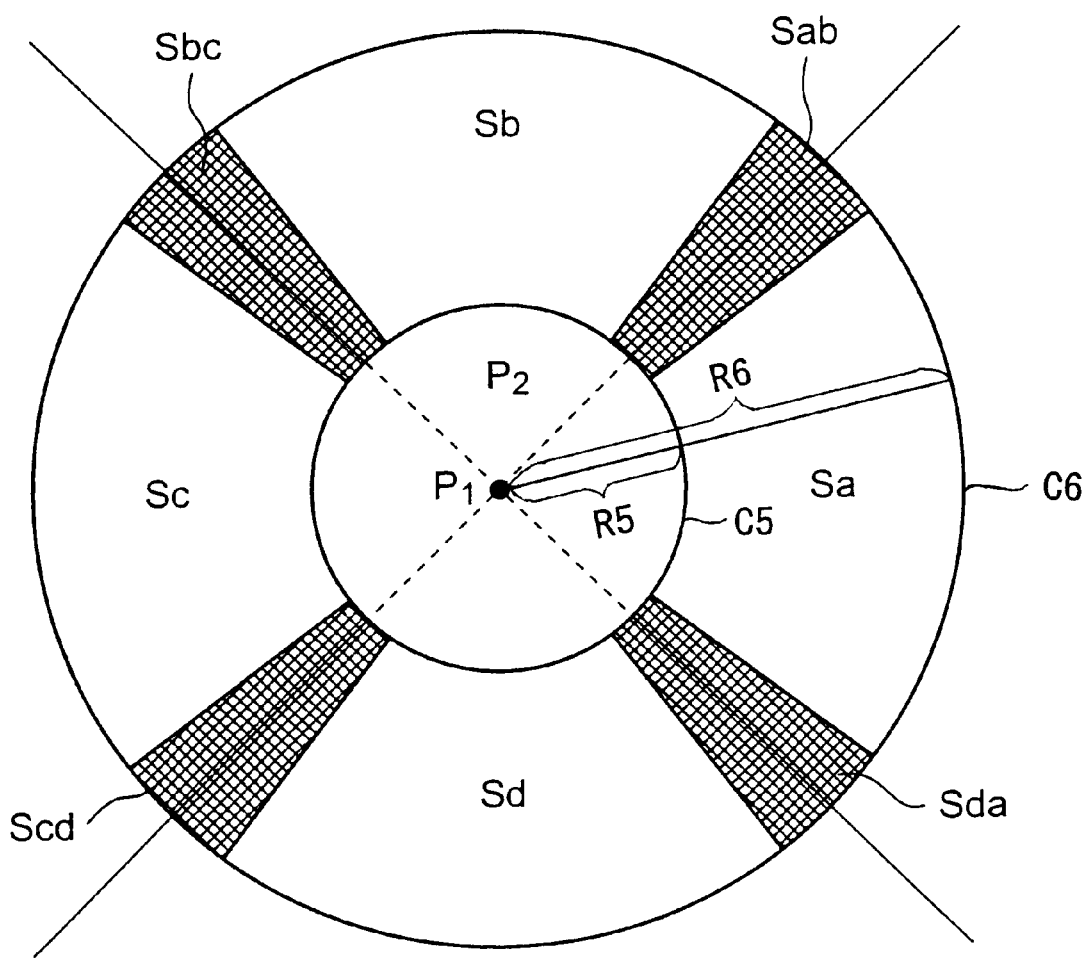
FIG. 36 is a diagram illustrating various operations which may be carried out by the second embodiment of the present invention.

FIG. 36 is a diagram illustrating various operations which may be carried out by the second embodiment of the present invention. There is a first touch on the touch screen 11 at position P1. The position P1 is illustrated as a center of a circle C5 of radius R5 and of a circle C6 of radius R6. The region outside circle C5 and inside circle C6 is divided into regions Sa, Sb, Sc and Sd which are separated by non-sensitive regions Sab, Sbc, Scd and Sda.

If, after a touch at position P1 during T1, there is a touch in region Sa during phase T2 and a release during T3, the operation is regarded as a single click of the right button. If, after a touch at position P1 during T1, there is a touch in region Sb during phase T2 and a release during T3, the operation is regarded as a second operation. If, after a touch at position P1 during T1, there is a touch in region Sc during phase T2 and a release during T3, the operation is regarded as a third operation. If, after a touch at position P1 during T1, there is a touch in region Sd during phase T2 and a release during T3, the operation is regarded as a fourth operation.

With the embodiment described above, second through fourth operations can be recognized in addition to the single click of the right button. The non-sensitive regions Sab, Sbc, Scd and Sda may prevent false operations of the touch screen unit 4. Also, further operations can be achieved by increasing the number of predetermined regions provided on the touch screen.

Further, the present invention is not limited to these embodiments, but variations and modifications may be made without departing from the scope of the present invention.

The present application is based on Japanese priority application No. 11-186599 filed on Jun. 30, 1999, the entire contents of which are hereby incorporated by reference.

What is claimed is:

1. A touch screen unit comprising:
    a touch-sensitive panel outputting a first voltage signal corresponding to a position of a first contact made thereon and a second voltage signal corresponding to a position of a second contact made thereon made after the first contact; and
    a control unit generating coordinate information and operation information of the first and second contacts based on said first and second voltage signals,
    wherein said operation information is capable of achieving an operation made by two or more switches.

2. The touch screen unit as claimed in claim 1,
    wherein said control unit generates operation information based on timing of said first and second contacts made on the touch-sensitive panel.

3. The touch screen unit as claimed in claim 1,
    wherein said control unit generates operation information based on positional relationship between said first and second contacts made on the touch-sensitive panel.

4. The touch screen unit as claimed in claim 1, wherein the second contact does not occur while the first contact occurs.

5. The touch screen unit as claimed in claim 1, wherein:
    one of the switches corresponds to the second contact occurring at a first distance relative to the first contact,
    another one of the switches corresponds to the second contact occurring at a second distance relative to the first contact, and
    the first distance is different than the second distance.

6. A computer system comprising:
    a touch screen unit; and
    a computer connected to the touch screen unit,
    said touch screen unit comprising:
        a touch-sensitive panel outputting a first voltage signal corresponding to a position of a first contacts made thereon and a second voltage signal corresponding to a position of a second contact made thereon after said first contact; and
        a control unit generating coordinate information and operation information of the first and second contacts based on said first and second voltage signals, said operation information being capable of achieving an operation made by two or more switches,
        wherein the coordinate information and the operation information are transmitted to the computer,
        wherein said control unit generates operation information based on size and angle of a vector of said first and second contacts made on the touch-sensitive panel.

7. The computer system as claimed in claim 6,
    wherein said control unit generates operation information based on timing of said first and second contacts made on the touch-sensitive panel.

8. The computer system as claimed in claim 6,
    wherein said control unit generates operation information based on positional relationship between said first and second contacts made on the touch-sensitive panel.

9. The computer system as claimed in claim 6, wherein one of said switches corresponds to a right button of a mouse and another one of said switches corresponds to a left button of a mouse.

10. A computer system comprising:
    a touch screen unit; and
    a computer connected to the touch screen unit,
    said touch screen unit comprising:
        a touch-sensitive panel outputting a first voltage signal corresponding to a position of a first contacts made thereon and a second voltage signal corresponding to a position of a second contact made thereon after said first contact; and
        a control unit generating coordinate information and operation information of the first and second contacts based on said first and second voltage signals,
    said computer comprising:
        a processing unit generating operation information being capable of achieving an operation made by two or more switches based on said first and second voltage signals supplied from the touch screen unit,
        wherein the coordinate information is transmitted to the computer,
        wherein said control unit generates operation information based on size and angle of a vector of said first and second contacts made on the touch-sensitive panel.

11. The computer system as claimed in claim 10,
    wherein said processing unit generates operation information based on timing of said first and second contacts made on the touch-sensitive panel.

12. The computer system as claimed in claim 10,
    wherein said processing unit generates operation information based on positional relationship between first and second contacts made on the touch-sensitive panel.

13. The computer system as claimed in claim 10, wherein one of said switches corresponds to a right button of a mouse and another one of said switches corresponds to a left button of a mouse.

14. The computer system as claimed in claim 10, wherein the second contact does not occur while the first contact occurs.

15. The computer system as claimed in claim 10, wherein:
    one of the switches corresponds to the second contact occurring at a first distance relative to the first contact,
    another one of the switches corresponds to the second contact occurring at a second distance relative to the first contact, and
    the first distance is different than the second distance.

16. A method of operating a touch screen unit, said method comprising:
    outputting a first voltage signal corresponding to a position of a first contact made on a touch-sensitive panel and a second voltage signal corresponding to a position of a second contact made on said touch-sensitive panel after said first contact; and
    generating coordinate information and operation information of the first and second contacts based on said first and second voltage signals, said operation information being capable of achieving an operation made by two or more switches,
    wherein said generating is implemented based on size and angle of a vector of said first and second contacts made on the touch-sensitive panel.

17. The method as claimed in claim 16,
    wherein said generating is implemented based on timing of said first and second contacts made on the touch-sensitive panel.

18. The method as claimed in claim 16,
    wherein said generating is implemented based on positional relationship between said first and second contacts made on the touch-sensitive panel.

19. A method of operating a computer system comprising a touch screen unit and a computer connected to the touch screen unit, said method comprising:
- outputting a first voltage signal corresponding to a position of a first contact made on a touch-sensitive panel and a second voltage signal corresponding to a position of a second contact made on said touch-sensitive panel after said first contact; and
- generating coordinate information and operation information of the first and second contacts based on said first and second voltage signals, said operation information being capable of achieving an operation made by two or more switches; and
- transmitting the coordinate information and the operation information from the touch screen unit to the computer,
- wherein said generating is implemented based on size and angle of a vector of said first and second contacts made on the touch-sensitive panel.

20. The method as claimed in claim 19,
wherein said generating is implemented based on timing of said first and second contacts made on the touch-sensitive panel.

21. The method as claimed in claim 19,
wherein said generating is implemented based on positional relationship between said first and second contacts made on the touch-sensitive panel.

22. A method of operating a computer unit comprising a touch screen unit and a computer connected to the touch screen unit, said method comprising:
- outputting a first voltage signal corresponding to a position of a first contacts made on a touch-sensitive panel and a second voltage signal corresponding to a position of a second contact made on the touch sensitive panel after said first contact;
- generating coordinate information at the touch screen unit;
- generating operation information at the computer, said operation information being capable of achieving an operation made by two or more switches based on said first and second voltage signals supplied from the touch screen unit; and
- transmitting the coordinate information from the touch screen unit to the computer,
- wherein said generating operation information is implemented based on size and angle of a vector of said first and second contacts made on the touch-sensitive panel.

23. The method as claimed in claim 22,
wherein said generating operation information is implemented based on timing of said first and second contacts made on the touch-sensitive panel.

24. The method as claimed in claim 22,
wherein said generating is implemented based on positional relationship between said first and second contacts made on the touch-sensitive panel.

25. A machine readable medium storing program code for causing a machine to detect a set of coordinates of a position of a contact made on a position-sensitive surface, comprising:
- first program code means for outputting a first voltage signal concerning a position of a first contact made on a touch sensitive panel and a second voltage signal corresponding to a position of a second voltage signal corresponding to a position of a second contact made on said touch sensitive panel after said first contact;
- second program code means for generating coordinate information and operation information of the first and second contacts based on said first and second voltage signals, at the touch screen unit, said operation information being capable of achieving an operation made by two or more switches; and
- third program code means for transmitting the coordinate information and the operation information from the touch screen unit to the computer,
- wherein said operation information is generated based on size and angle of a vector of said first and second contacts made on the touch-sensitive panel.

26. The machine readable medium as claimed in claim 25,
wherein said operation information is generated based on timing of said first and second contacts made on the touch-sensitive panel.

27. The machine readable medium as claimed in claim 25,
wherein said operation information is generated based on positional relationship between said first and second contacts made on the touch-sensitive panel.

28. The machine readable medium as claimed in claim 25,
wherein the second contact does not occur while the first contact occurs.

29. The machine readable medium as claimed in claim 25, wherein:
- one of the switches corresponds to the second contact occurring at a first distance relative to the first contact,
- another one of the switches corresponds to the second contact occurring at a second distance relative to the first contact, and
- the first distance is different than the second distance.

30. A machine readable medium storing program code for causing a machine to detect a set of coordinates of a position of a contact made on a position-sensitive surface, comprising:
- first program code means for outputting a first voltage signal concerning a position of a first contact made on a touch sensitive panel and a second voltage signal corresponding to a position of a second voltage signal corresponding to a position of a second contact made on said touch sensitive panel after said first contact;
- second program code means for generating coordinate information at the touch screen unit;
- third program code means for generating operation information at the computer, said operation information being capable of achieving an operation made by two or more switches based on said first and second voltage signals supplied from the touch screen-unit; and
- fourth program code means for transmitting the coordinate information from the touch screen unit to the computer,
- wherein said operation information is generated based on size and angle of a vector of said first and second contacts made on the touch-sensitive panel.

31. The machine readable medium as claimed in claim 30,
wherein said operation information is generated based on timing of said first and second contacts made on the touch-sensitive panel.

32. The machine readable medium as claimed in claim 30,
wherein said operation information is generated based on positional relationship between said first and second contacts made on the touch-sensitive panel.

33. A touch screen unit comprising:
- a touch-sensitive panel outputting voltage signals concerning a position of a contact made thereon; and
- a control unit generating coordinate information and operation information of the contact based on said voltage signals, wherein said operation information corresponds to operations of two or more switches, wherein said control unit generates operation information based on size and angle of a vector of contacts made on the touch-sensitive panel.

34. A computer system comprising:

a touch screen unit; and a computer connected to the touch screen unit, said touch screen unit comprising:
- a touch-sensitive panel outputting voltage signals concerning a position of a contact made thereon; and
- a control unit generating coordinate information and operation information of the contacts based on said voltage signals, said operation information corresponding to operations of two or more switches, wherein the coordinate information and the operation information are transmitted to the computer, wherein said control unit generates operation information based on size and angle of a vector of contacts made on the touch-sensitive panel.

35. A computer system comprising:

a touch screen unit; and a computer connected to the touch screen unit, said touch screen unit comprising:
- a touch-sensitive panel outputting voltage signals concerning a position of a contact made thereon; and
- a control unit generating coordinate information of the contact based on said voltage signals, said computer comprising:
- a processing unit generating operation information corresponding to operations of two or more switches based on said voltage signals supplied from the touch screen unit, wherein the coordinate information is transmitted to the computer, wherein said processing unit generates operation information based on size and angle of a vector of contacts made on the touch-sensitive panel.

36. A method of operating a touch screen unit, said method comprising:

outputting voltage signals concerning a position of a contact made on a touch-sensitive panel; and generating coordinate information and operation information of the contact based on said voltage signals, said operation information corresponding to operations of two or more switches, wherein said generating the coordinate information and the operation information is implemented based on size and angle of a vector of contacts made on the touch-sensitive panel.

37. A method of operating a computer system comprising a touch screen unit and a computer connected to the touch screen unit, said method comprising the steps of:

outputting voltage signals concerning a position of a contact made on said touch screen unit;

generating coordinate information and operation information of the contact based on said voltage signals, at the touch screen unit, said operation information corresponding to operations of two or more switches; and transmitting the coordinate information and the operation information from the touch screen unit to the computer, wherein said generating is implemented based on size and angle of a vector of contacts made on the touch-sensitive panel.

38. A method of operating a computer unit comprising a touch screen unit and a computer connected to the touch screen unit, said method comprising:

outputting voltage signals concerning a position of a contact made on a touch-sensitive panel;

generating coordinate information at the touch screen unit;

generating operation information at the computer, said operation information corresponding to operations of two or more switches based on said voltage signals supplied from the touch screen unit; and transmitting the coordinate information from the touch screen unit to the computer, wherein said generating operation information is implemented based on size and angle of a vector of contacts made on the touch-sensitive panel.

39. A machine readable medium storing program code for causing a machine to detect a set of coordinates of a position of a contact made on a position-sensitive surface, comprising:

first program code means for outputting voltage signals concerning a position of a contact made on said touch screen unit;

second program code means for generating coordinate information and operation information of the contact based on said voltage signals, at the touch screen unit, said operation information corresponding to operations of two or more switches; and third program code means for transmitting the coordinate information and the operation information from the touch screen unit to the computer, wherein said operation information is generated based on size and angle of a vector of contacts made on the touch-sensitive panel.

40. A machine readable medium storing program code for causing a machine to detect a set of coordinates of a position of a contact made on a position-sensitive surface, comprising:

first program code means for outputting voltage signals concerning a position of a contact made on said touch screen unit;

second program code means for generating coordinate information at the touch screen unit;

third program code means for generating operation information at the computer, said operation information corresponding to operations of two or more switches based on said voltage signals supplied from the touch screen-unit; and fourth program code means for transmitting the coordinate information from the touch screen unit to the computer, wherein said operation information is generated based on size and angle of a vector of contacts made on the touch-sensitive panel.

* * * * *

UNITED STATES PATENT AND TRADEMARK OFFICE
CERTIFICATE OF CORRECTION

PATENT NO. : 6,590,567 B1  Page 1 of 1
DATED : July 8, 2003
INVENTOR(S) : Naoyuki Nagao et al.

It is certified that error appears in the above-identified patent and that said Letters Patent is hereby corrected as shown below:

<u>Column 17,</u>
Line 12, change "." to -- ; --;
Between lines 12 and 13, insert the following paragraph:
-- wherein said control unit generates operation information based on size and angle of a vector of said first and second contacts made on the touch-sensitive panel. --

Signed and Sealed this

Twenty-third Day of December, 2003

JAMES E. ROGAN
*Director of the United States Patent and Trademark Office*